(12) United States Patent
Tokuchi

(10) Patent No.: US 10,949,136 B2
(45) Date of Patent: Mar. 16, 2021

(54) INFORMATION PROCESSING DEVICE AND RECORDING MEDIUM

(71) Applicant: FUJI XEROX CO., LTD., Tokyo (JP)

(72) Inventor: Kengo Tokuchi, Kanagawa (JP)

(73) Assignee: FUJI XEROX CO., LTD., Tokyo (JP)

(*) Notice: Subject to any disclaimer, the term of this patent is extended or adjusted under 35 U.S.C. 154(b) by 0 days.

(21) Appl. No.: 16/103,099

(22) Filed: Aug. 14, 2018

(65) Prior Publication Data

US 2019/0258428 A1 Aug. 22, 2019

(30) Foreign Application Priority Data

Feb. 20, 2018 (JP) .............................. JP2018-028169

(51) Int. Cl.
*G06F 3/12* (2006.01)
*G06F 9/54* (2006.01)
*G06K 9/00* (2006.01)
*G06F 3/0484* (2013.01)
*G06F 3/0482* (2013.01)

(52) U.S. Cl.
CPC .......... *G06F 3/1205* (2013.01); *G06F 3/0482* (2013.01); *G06F 3/04842* (2013.01); *G06F 3/1253* (2013.01); *G06F 3/1286* (2013.01); *G06F 9/542* (2013.01); *G06K 9/00087* (2013.01)

(58) Field of Classification Search
CPC .. G06F 3/1205; G06F 3/04842; G06F 3/1253; G06F 9/542; G06F 9/00087; H04N 1/00474; H04N 1/002521; H04N 1/00403; H04N 1/00413; H04N 1/0049; H04N 1/00503; H04N 2201/0094
USPC ................................ 358/1.1–1.18, 402, 474
See application file for complete search history.

(56) References Cited

U.S. PATENT DOCUMENTS

| | | | |
|---|---|---|---|
| 9,077,830 B2* | 7/2015 | Shibao | H04N 1/00347 |
| 9,137,393 B2 | 9/2015 | Sato | |
| 2006/0053194 A1* | 3/2006 | Schneider | H04L 12/1827 |
| | | | 709/204 |
| 2009/0323096 A1* | 12/2009 | Oshima | G06Q 10/06 |
| | | | 358/1.13 |
| 2017/0324877 A1* | 11/2017 | Tokuchi | H04N 1/00251 |
| 2018/0284953 A1* | 10/2018 | Brunault | G06F 3/04815 |

FOREIGN PATENT DOCUMENTS

| | | |
|---|---|---|
| JP | 2011-166748 A | 8/2011 |
| JP | 2014-186530 A | 10/2014 |
| JP | 2017-10104 A | 1/2017 |

* cited by examiner

*Primary Examiner* — Gabriel I Garcia
(74) *Attorney, Agent, or Firm* — Oliff PLC

(57) ABSTRACT

An information processing device includes a controller that controls a notification of information in a case in which a first image for executing a first function and a second image for executing a second function are selected together.

19 Claims, 13 Drawing Sheets

| IMAGE ID | CONFIGURATION | CONTACTING OBJECT | CONTENT OF LINK FUNCTION |
|---|---|---|---|
| A, B | - MULTI-FUNCTION DEVICE A<br>- PC(B) | - FINGER | - SCAN FORWARDING FUNCTION |
| | | - STYLUS | - PRINT FUNCTION |
| | | ... | ... |
| K, M | - CHARACTER RECOGNITION SOFTWARE K<br>- FORM CREATION SOFTWARE M | - FINGER | - FUNCTION OF ADDING RECOGNIZED CHARACTER STRING TO ACCOUNTING FILE |
| | | - STYLUS | - FUNCTION OF APPLYING CHARACTER RECOGNITION PROCESS TO ACCOUNTING FILE |
| | | ... | ... |
| E, F | - DOCUMENT FILE E<br>- ACCOUNTING FILE F | - FINGER | - FUNCTION OF ADDING CONTENT OF DOCUMENT FILE TO ACCOUNTING FILE |
| | | - STYLUS | - FUNCTION OF ADDING CONTENT OF ACCOUNTING FILE TO DOCUMENT FILE |
| | | ... | ... |
| ... | ... | ... | ... |

FIG. 3

| IMAGE ID | EQUIPMENT (ALL, PART) | SOFTWARE | TARGET | CONTENT OF LONE FUNCTION |
|---|---|---|---|---|
| A | - MULTI-FUNCTION DEVICE A | | | - PRINT FUNCTION, SCAN FUNCTION, COPY FUNCTION, FACSIMILE FUNCTION, AND THE LIKE |
| B | - PC(B) | | | - DISPLAY FUNCTION, COMMUNICATION FUNCTION, AND THE LIKE |
| C | | - DOCUMENT CREATION SOFTWARE C | | - DOCUMENT CREATION FUNCTION, DOCUMENT DISPLAY FUNCTION, AND THE LIKE |
| D | | - PASSWORD SETTING SOFTWARE D | | - PASSWORD SETTING FUNCTION |
| E | | | - DOCUMENT FILE E | - DOCUMENT CREATION FUNCTION, DOCUMENT DISPLAY FUNCTION, AND THE LIKE |
| F | | | - ACCOUNTING FILE F | - EDITING FUNCTION, DISPLAY FUNCTION, AND THE LIKE |
| ⋮ | ⋮ | ⋮ | ⋮ | ⋮ |

FIG. 4

| IMAGE ID | EQUIPMENT (ALL, PART) | SOFTWARE | TARGET | CONTENT OF LINK FUNCTION |
|---|---|---|---|---|
| A, B | - MULTI-FUNCTION DEVICE A<br>- PC(B) | | | - SCAN FORWARDING FUNCTION<br>- PRINT FUNCTION |
| G, H | - DOOR OPEN/CLOSE SENSOR G<br>- ILLUMINATION DEVICE H | | | - FUNCTION OF TURNING ON ILLUMINATION DEVICE WHEN OPENING OF DOOR IS SENSED |
| C, D | | - DOCUMENT CREATION SOFTWARE C<br>- PASSWORD SETTING SOFTWARE D | | - FUNCTION OF SETTING PASSWORD ON DOCUMENT FILE |
| C, J | | - DOCUMENT CREATION SOFTWARE C<br>- DATA TRANSMISSION SOFTWARE J | | - FUNCTION OF TRANSMITTING DOCUMENT FILE |
| E, F | | | - DOCUMENT FILE E<br>- ACCOUNTING FILE F | - FUNCTION OF ADDING CONTENT OF DOCUMENT FILE TO ACCOUNTING FILE |
| A, K | - MULTI-FUNCTION DEVICE A | - CHARACTER RECOGNITION SOFTWARE K | | - FUNCTION OF APPLYING CHARACTER RECOGNITION PROCESS TO SCANNED DOCUMENT |
| A, E | - MULTI-FUNCTION DEVICE A | | - DOCUMENT FILE E | - FUNCTION OF PRINTING DOCUMENT FILE |
| K, L | | - CHARACTER RECOGNITION SOFTWARE K | - IMAGE FILE L | - FUNCTION OF EXTRACTING TEXT FROM IMAGE FILE |
| ... | - SCANNER | - CHARACTER RECOGNITION SOFTWARE<br>- FORM CREATION SOFTWARE | - RECEIPT<br>- ACCOUNTING FILE | - FUNCTION OF ADDING CONTENT OF RECEIPT TO ACCOUNTING FILE WHEN RECEIPT IS SCANNED |
| ... | | - WEB BROWSER<br>- SHOPPING SITE<br>- PURCHASE INSTRUCTION | - DESIGNER HANDBAG (SHOPPING TARGET) | - PURCHASE WHEN DESIGNER HANDBAG IS UP FOR SALE ON SHOPPING SITE |
| ... | ... | ... | ... | ... |

FIG. 10

| IMAGE ID | EQUIPMENT (ALL, PART) | SOFTWARE | TARGET | CONTENT OF LINK FUNCTION |
|---|---|---|---|---|
| A, B | - MULTI-FUNCTION DEVICE A<br>- PC(B) | | | - SCAN FORWARDING FUNCTION (A→B: 1ST, B→A: 2ND)<br>- PRINT FUNCTION (B→A: 1ST, A→B: 2ND) |
| K, M | | - CHARACTER RECOGNITION SOFTWARE K<br>- FORM CREATION SOFTWARE M | | - FUNCTION OF ADDING RECOGNIZED CHARACTER STRING TO FILE (K→M: 1ST, M→K: 2ND)<br>- FUNCTION OF APPLYING CHARACTER RECOGNITION PROCESS TO ACCOUNTING FILE (M→K: 1ST, K→M: 2ND) |
| E, F | | | - DOCUMENT FILE E<br>- ACCOUNTING FILE F | - FUNCTION OF ADDING CONTENT OF DOCUMENT FILE TO ACCOUNTING FILE (E→F: 1ST, F→E: 2ND)<br>- FUNCTION OF ADDING CONTENT OF ACCOUNTING FILE TO DOCUMENT FILE (F→E: 1ST, E→F: 2ND) |
| ⋮ | ⋮ | ⋮ | ⋮ | ⋮ |

FIG. 13

| IMAGE ID | CONFIGURATION | SELECTION TIME (TOUCH TIME) | CONTENT OF LINK FUNCTION |
|---|---|---|---|
| A, B | - MULTI-FUNCTION DEVICE A<br>- PC(B) | - LEVEL 1 | - SCAN FORWARDING FUNCTION |
| | | - LEVEL 2 | - PRINT FUNCTION |
| | | - LEVEL 3 | ... |
| K, M | - CHARACTER RECOGNITION SOFTWARE K<br>- FORM CREATION SOFTWARE M | - LEVEL 1 | - FUNCTION OF ADDING RECOGNIZED CHARACTER STRING TO ACCOUNTING FILE |
| | | - LEVEL 2 | - FUNCTION OF APPLYING CHARACTER RECOGNITION PROCESS TO ACCOUNTING FILE |
| | | - LEVEL 3 | ... |
| E, F | - DOCUMENT FILE E<br>- ACCOUNTING FILE F | - LEVEL 1 | - FUNCTION OF ADDING CONTENT OF DOCUMENT FILE TO ACCOUNTING FILE |
| | | - LEVEL 2 | - FUNCTION OF ADDING CONTENT OF ACCOUNTING FILE TO DOCUMENT FILE |
| | | - LEVEL 3 | ... |
| ... | ... | ... | ... |

FIG. 14

| USER ID | IMAGE ID | CONFIGURATION | CONTENT OF LINK FUNCTION |
|---|---|---|---|
| AAA | A | - MULTI-FUNCTION DEVICE A | |
| BBB | B | - PC(B) | - SCAN FORWARDING FUNCTION |
| AAA | B | - PC(B) | |
| BBB | A | - MULTI-FUNCTION DEVICE A | - PRINT FUNCTION |
| AAA | K | - CHARACTER RECOGNITION SOFTWARE K | - FUNCTION OF ADDING RECOGNIZED CHARACTER STRING TO ACCOUNTING FILE |
| BBB | M | - FORM CREATION SOFTWARE M | |
| AAA | M | - FORM CREATION SOFTWARE M | - FUNCTION OF APPLYING CHARACTER RECOGNITION PROCESS TO ACCOUNTING FILE |
| BBB | K | - CHARACTER RECOGNITION SOFTWARE K | |
| AAA | E | - DOCUMENT FILE E | - FUNCTION OF ADDING CONTENT OF DOCUMENT FILE TO ACCOUNTING FILE |
| BBB | F | - ACCOUNTING FILE F | |
| AAA | F | - ACCOUNTING FILE F | - FUNCTION OF ADDING CONTENT OF ACCOUNTING FILE TO DOCUMENT FILE |
| BBB | E | - DOCUMENT FILE E | |
| ⋮ | ⋮ | ⋮ | ⋮ |

FIG. 15

| IMAGE ID | CONFIGURATION | CONTACT AREA | CONTENT OF LINK FUNCTION |
|---|---|---|---|
| A, B | - MULTI-FUNCTION DEVICE A<br>- PC(B) | - LEVEL 1 | - SCAN FORWARDING FUNCTION |
| | | - LEVEL 2 | - PRINT FUNCTION |
| | | - LEVEL 3 | ... |
| K, M | - CHARACTER RECOGNITION SOFTWARE K<br>- FORM CREATION SOFTWARE M | - LEVEL 1 | - FUNCTION OF ADDING RECOGNIZED CHARACTER STRING TO ACCOUNTING FILE |
| | | - LEVEL 2 | - FUNCTION OF APPLYING CHARACTER RECOGNITION PROCESS TO ACCOUNTING FILE |
| | | - LEVEL 3 | ... |
| E, F | - DOCUMENT FILE E<br>- ACCOUNTING FILE F | - LEVEL 1 | - FUNCTION OF ADDING CONTENT OF DOCUMENT FILE TO ACCOUNTING FILE |
| | | - LEVEL 2 | - FUNCTION OF ADDING CONTENT OF ACCOUNTING FILE TO DOCUMENT FILE |
| | | - LEVEL 3 | ... |
| ... | ... | ... | ... |

FIG. 16

| IMAGE ID | CONFIGURATION | PRESSURE | CONTENT OF LINK FUNCTION |
|---|---|---|---|
| A, B | - MULTI-FUNCTION DEVICE A<br>- PC(B) | - LEVEL 1 | - SCAN FORWARDING FUNCTION |
| | | - LEVEL 2 | - PRINT FUNCTION |
| | | - LEVEL 3 | ... |
| K, M | - CHARACTER RECOGNITION SOFTWARE K<br>- FORM CREATION SOFTWARE M | - LEVEL 1 | - FUNCTION OF ADDING RECOGNIZED CHARACTER STRING TO ACCOUNTING FILE |
| | | - LEVEL 2 | - FUNCTION OF APPLYING CHARACTER RECOGNITION PROCESS TO ACCOUNTING FILE |
| | | - LEVEL 3 | ... |
| E, F | - DOCUMENT FILE E<br>- ACCOUNTING FILE F | - LEVEL 1 | - FUNCTION OF ADDING CONTENT OF DOCUMENT FILE TO ACCOUNTING FILE |
| | | - LEVEL 2 | - FUNCTION OF ADDING CONTENT OF ACCOUNTING FILE TO DOCUMENT FILE |
| | | - LEVEL 3 | ... |
| ... | ... | ... | ... |

FIG. 17

| IMAGE ID | CONFIGURATION | CONTACTING OBJECT | CONTENT OF LINK FUNCTION |
|---|---|---|---|
| A, B | - MULTI-FUNCTION DEVICE A<br>- PC(B) | - FINGER | - SCAN FORWARDING FUNCTION |
|  |  | - STYLUS | - PRINT FUNCTION |
|  |  | ⋮ | ⋮ |
| K, M | - CHARACTER RECOGNITION SOFTWARE K<br>- FORM CREATION SOFTWARE M | - FINGER | - FUNCTION OF ADDING RECOGNIZED CHARACTER STRING TO ACCOUNTING FILE |
|  |  | - STYLUS | - FUNCTION OF APPLYING CHARACTER RECOGNITION PROCESS TO ACCOUNTING FILE |
|  |  | ⋮ | ⋮ |
| E, F | - DOCUMENT FILE E<br>- ACCOUNTING FILE F | - FINGER | - FUNCTION OF ADDING CONTENT OF DOCUMENT FILE TO ACCOUNTING FILE |
|  |  | - STYLUS | - FUNCTION OF ADDING CONTENT OF ACCOUNTING FILE TO DOCUMENT FILE |
|  |  | ⋮ | ⋮ |
| ⋮ | ⋮ |  |  |

INFORMATION PROCESSING DEVICE AND RECORDING MEDIUM

CROSS-REFERENCE TO RELATED APPLICATIONS

This application is based on and claims priority under 35 USC 119 from Japanese Patent Application No. 2018-028169 filed Feb. 20, 2018.

BACKGROUND

Technical Field

The present invention relates to an information processing device and a recording medium.

SUMMARY

According to an aspect of the invention, there is provided an information processing device including a controller that controls a notification of information in a case in which a first image for executing a first function and a second image for executing a second function are selected together.

BRIEF DESCRIPTION OF THE DRAWINGS

Exemplary embodiment of the present invention will be described in detail based on the following figures, wherein:

FIG. 3 is a diagram illustrating an example of a lone function management table;
FIG. 4 is a diagram illustrating an example of a link function management table;
FIG. 10 is a diagram illustrating a link function management table according to Exemplary Modification 4;
FIG. 13 is a diagram illustrating a link function management table according to Exemplary Modification 5;
FIG. 14 is a diagram illustrating a link function management table according to Exemplary Modification 7;
FIG. 15 is a diagram illustrating a link function management table according to Exemplary Modification 8;
FIG. 16 is a diagram illustrating a link function management table according to Exemplary Modification 9;
and
FIG. 17 is a diagram illustrating a link function management table according to Exemplary Modification 10.

DETAILED DESCRIPTION

Figure 1:
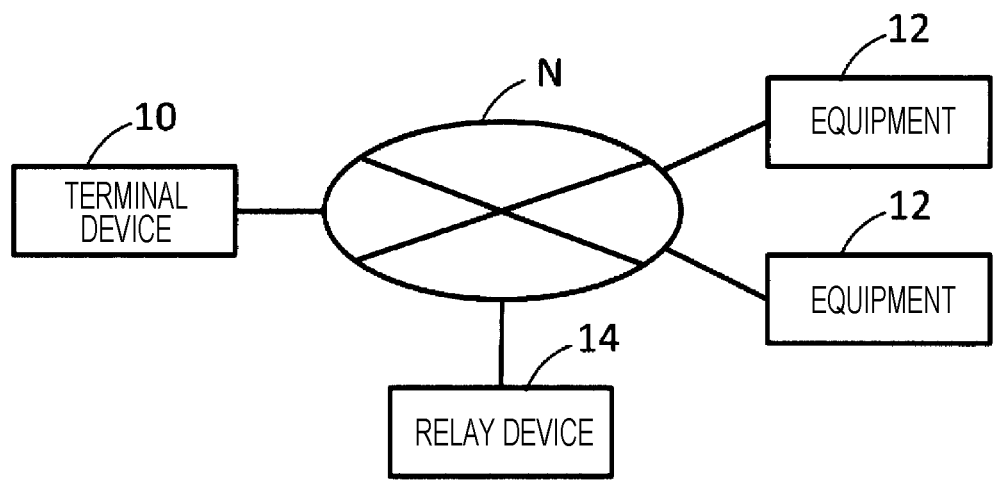
FIG. 1 is a block diagram illustrating a configuration of an information processing system according to an exemplary embodiment of the present invention.

An information processing system according to an exemplary embodiment of the present invention will be described with reference to FIG. 1. FIG. 1 illustrates an example of an information processing system according to the present exemplary embodiment.

As an example, the information processing system according to the present exemplary embodiment includes one or multiple terminal devices 10, one or multiple pieces of equipment 12, and one or multiple relay devices 14. In the example illustrated in FIG. 1, the information processing system includes one terminal device 10, two pieces of equipment 12, and one relay device 14. These numbers are merely only example, and different numbers of terminal devices, pieces of equipment, and relay devices may be included in the information processing system. As an example, the terminal device 10, the equipment 12, and the relay device 14 include a function of communicating with each other via a communication path N such as a network. The communication may be wireless communication or wired communication. The Internet may also be used as the communication path N. Obviously, the terminal device 10, the equipment 12, and the relay device 14 may communicate with other devices via respectively different communication paths or communicate with other devices directly, without going through the communication path N. Additionally, the relay device 14 may also function as a hub that interconnects multiple devices, and by connecting to the relay device 14, the terminal device 10 and the equipment 12 may communicate with each other through the relay device 14. A device such as a server may also be included in the information processing system.

Note that in the case in which the relay device 14 is not used, the relay device 14 does not have to be included in the information processing system. Similarly, in the case in which the equipment 12 is not used, the equipment 12 does not have to be included in the information processing system. As described later, functions (lone functions and link functions) are executed using software, the equipment 12, and the like. In the case in which the equipment 12 is not used for such functions, the equipment 12 does not have to be included in the information processing system. This functions will be described in detail later.

The terminal device 10 is a device such as a personal computer (PC), a tablet PC, a smartphone, or a mobile phone, and includes a function of communicating with other devices. The terminal device 10 may also be a wearable terminal (such as a wristwatch-style terminal, a wristband-style terminal, an eyeglasses-style terminal, a ring-style terminal, a contact lens-style terminal, a body implant-style terminal, or a bearable terminal). Additionally, the terminal device 10 may also include a flexible display as a display device. As the flexible display, for example, an organic electroluminescence display (flexible organic EL display), an electronic paper display, a flexible liquid crystal display, or the like is used. A flexible display adopting a display method other than the above may also be used. A flexible display is a display whose display portion is flexibly deformable, and is a display which may be curved, folded, rolled, twisted, or stretched, for example. The entire terminal device 10 may be configured as a flexible display, or the flexible display and the rest of the configuration may be divided functionally or physically.

The equipment 12 is a device having a function, and is a device such as, for example, an image forming device provided with image forming functions (such as a scan function, a print function, a copy function, and a facsimile function), a PC, a tablet PC, a smartphone, a mobile phone, a robot (such as a humanoid robot, a non-human animal-type robot, or some other type of robot), a projector, a display device such as a liquid crystal display, a recording device, a playback device, an imaging device such as a camera, a refrigerator, a rice cooker, a microwave oven, a coffee maker, a vacuum cleaner, a washing machine, an air conditioner, lighting equipment, a clock, a surveillance camera, an automobile, a motorcycle, an aircraft (for example, an unmanned aircraft (also called a drone)), a game console, various types of sensing equipment (such as a temperature sensor, a humidity sensor, a voltage sensor, or a current sensor, for example), and the like. The equipment 12 may be equipment that presents an output to the user (such as an image forming device or a PC, for example), or may be equipment that does not present an output to the user (for example, sensing equipment). Also, all functions among the multiple pieces of equipment that execute a link function described later may be equipment that presents an output to the user, or alternatively, some equipment may be equipment that presents an output to the user while other equipment is equipment that does not present an output to the user, or alternatively, all equipment may be equipment that does not present an output to the user. Equipment in general may also be included in the conceptual category of the equipment 12. For example, information equipment, video equipment, audio equipment, and other types of equipment may be included in the category of equipment according to the present exemplary embodiment. Also, the equipment 12 includes a function of communicating with other devices.

The relay device 14 is a device that controls the operation of each piece of equipment 12. Also, the relay device 14 includes a function of communicating with other devices. For example, the relay device 14 may also acquire various types of information by utilizing the Internet or the like. The relay device 14 may also function as a server, manage data and user information, and the like. The relay device 14 may also be what is called a smart speaker (equipment including a wireless communication function and a speaker function), and may also be equipment that includes a communication function but does not include a speaker function. The relay device 14 may be installed indoors (such as on the floor, ceiling, or on a table in a room), or may installed outdoors. Also, the relay device 14 may be movable equipment (for example, self-propelled equipment). Note that the equipment 12 itself may also function as the relay device 14.

The terminal device 10 may also control the operations of the equipment 12 by communicating with the equipment 12 directly or via another piece of equipment or a communication path, without going through the relay device 14.

In the present exemplary embodiment, as an example, the terminal device 10 corresponds to an example of an information processing device. Obviously, the equipment 12 and the relay device 14 may also correspond to an example of an information processing device.

Figure 2:
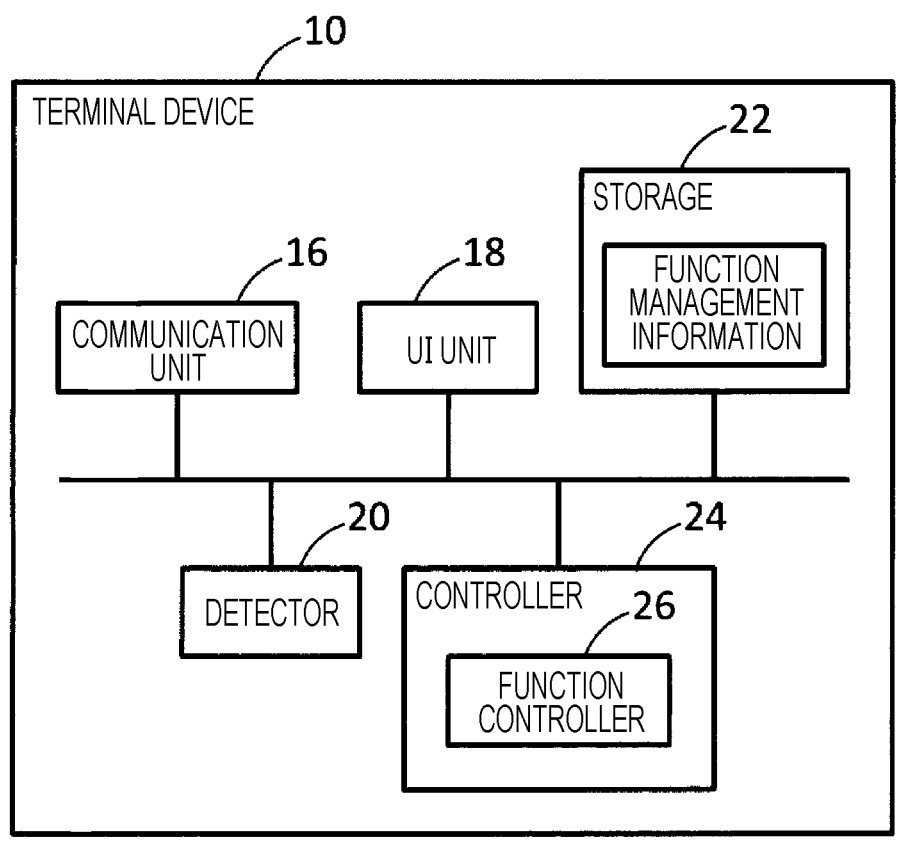
FIG. 2 is a block diagram illustrating a configuration of a terminal device.

Hereinafter, a configuration of the terminal device 10 will be described in detail with reference to FIG. 2.

A communication unit 16 is a communication interface, and includes a function of transmitting data to other devices, and a function of receiving data from other devices. The communication unit 16 may be a communication interface including a wireless communication function, or a communication interface including a wired communication function. For example, the communication unit 16 may support one or multiple types of communication schemes, and may communicate with a communication peer in accordance with a communication scheme suited to the communication peer (in other words, a communication scheme supported by the communication peer). The communication schemes are, for example, infrared communication, visible-light communication, Wi-Fi (registered trademark) communication, short-range wireless communication (such as near field communication (NFC), for example), and the like. As the short-range wireless communication, Felica (registered trademark), Bluetooth (registered trademark), radio-frequency identification (RFID), and the like are used. Obviously, wireless communication of a different scheme may also be used as the short-range wireless communication. The communication unit 16 may switch the communication scheme and frequency band depending on the communication peer, and may also switch the communication scheme and the frequency band depending on the surrounding environment.

The UI unit 18 is a user interface, and includes a display and an operating unit. The display is a display device such as a liquid crystal display, for example. The display may also be a flexible display. The operating unit is an input device such as a touch panel or a keyboard, for example. A user interface combining a display and an operating unit (for example, a touchscreen display, including a device or the like that displays a keyboard or the like electronically on a display) is also acceptable. Additionally, the UI unit 18 may also include a sound collector, such as a microphone, and a sound emitter, such as a speaker. In this case, information input by speech may also be input into the terminal device 10, and information may also be emitted as speech.

A detector 20 is configured to detect contact with an object on the screen of the display included in the UI unit 18. Also, the detector 20 is configured to detect when an object in contact with the screen moves away from the screen. For this detection, a sensor such as a pressure sensor, an image sensor, an acceleration sensor, a gyro sensor, or an infrared sensor is used, for example. A single sensor may be used, or multiple sensors may be used. The sensor may be provided in the terminal device 10, or may be provided in a device or location other than the terminal device 10. The object is, for example, part of the user's body (for example, a finger or hand), a stylus, a pen, or the like.

For example, the detector 20 detects the position where the object is contacting on the screen, the contact area of the object with respect to the screen (the surface area of the portion contacting the screen on the object), the contact pressure of the object with respect to the screen (the pressure applied to the screen by the object), and the like. For example, an object touching the screen is captured by a camera having a function of capturing an image such as a moving image or a still image, and by using an image sensor, the detector 20 detects the contact area of the object with respect to the screen on the basis of the image captured by the camera. Note that the camera may be provided in the terminal device 10, or may be provided in a device or location other than the terminal device 10. By using a pressure sensor, the detector 20 may also detect the surface area of the portion on the screen where pressure is being applied as the contact area. Also, by using a camera, the detector 20 may also detect the user operating the UI unit 18 (for example, the user performing operations on the screen), and detect the object contacting the screen.

Storage 22 is a storage device such as a hard disk or memory (such as an SSD, for example). The storage 22 stores function management information, various data, various programs (such as an operating system (OS) and various application programs (application software), for example), information indicating the address of each piece of equipment 12 (equipment address information), information indicating the address of the relay device 14 (relay device address information), and the like, for example. Each piece of data, each piece of information, each program, and the like may be stored in separate storage devices, or in a single storage device.

The following describes function management information in detail. The function management information is information for managing functions which are executable by using a configuration (such as equipment acting as hardware, software, or a target, for example). For example, the function management information is pre-created and stored in the storage 22. The target that acts as a configuration is a file (data), a physical object, or the like to which a function is applied. The function may be a lone function or a link function. A lone function is a single function which is executable by using a single configuration, for example. A link function is a function which is executable by using multiple configurations. For example, a link function is a function which is executable by linking multiple configurations together. Additionally, a link function may also be a function which is executable by using multiple functions included in a single piece of equipment or a single piece of software.

The terminal device 10 and the relay device 14 may be used as equipment that executes lone functions and link functions, and functions included in the terminal device 10 and the relay device 14 may be used as lone functions and link functions. Software and files used in lone functions and link functions may be stored in the storage 22 of the terminal device 10, or may be stored in the equipment 12, the relay device 14, or another device (such as a server).

An entire piece of equipment, a specific part of a piece of equipment, a specific function of a piece of software, a set of functions including multiple functions, and the like may also be used as a configuration. For example, in the case in which a function is assigned to each part of a piece of equipment, a link function may be a function that uses the parts. Also, in the case in which a piece of software includes multiple functions, a link function may be a function that uses a subset of the multiple functions. A set of functions includes multiple functions, and by executing the multiple functions simultaneously or successively, a process according to the set of functions is executed. Also, a link function may be a function that uses only hardware, a function that uses only software, or a function that uses both hardware and software.

The function management information is information indicating correspondences between configurations used for functions (configuration identification information for identifying each configuration) and function information related to the functions, for example. For example, a long configuration used to execute a lone function and function information related to the lone function may be associated together and registered in the function management information. Also, a combination of multiple configurations used to execute a link function (a combination of configuration identification information for identifying each configuration) and function information related to the link function may be associated together and registered in the function management information.

In the case in which the configuration is a piece of equipment, the configuration identification information is information for identifying the piece of equipment (equipment identification information). In the case in which the configuration is a piece of software, the configuration identification information is information for identifying the piece of software (software identification information). In the case in which the configuration is a target, the configuration identification information is information for identifying the target (target identification information). The configuration identification information for identifying a piece of equipment may also include information indicating functions included in the equipment. Similarly, the configuration identification information for identifying a piece of software may also include information indicating functions included in the software.

The equipment identification information is, for example, a name of the equipment, an equipment ID, information indicating the type of equipment, a model number of the equipment, information for managing the equipment (such as assess management information, for example), information indicating a position where the equipment is installed (equipment position information), an image associated with the equipment (equipment image), equipment address information, and the like. The equipment image is an exterior image illustrating the piece of equipment, for example. The exterior image may be an image illustrating the outside of the equipment (for example, an equipment housing or case), an image illustrating a state of the interior (for example, the internal structure) as seen from the outside with the housing or case opened, or an image illustrating a state in which the equipment is covered by a packaging sheet or the like. The equipment image may be an image generated by capturing the equipment with an imaging device such as a camera (such as the image illustrating the exterior or the image illustrating the interior of the equipment), or an image illustrating the equipment schematically (such as an icon, for example). The equipment image may be a still image or a moving image. The equipment image data may be stored in the storage 22 or stored in another device (such as the equipment 12 or the relay device 14).

The software identification information is, for example, a name of the software, a software ID, information indicating the type of software, a model number of the software, information for managing the software, an image associated with the software (software image), and the like. The software image is, for example, an image illustrating the software (such as an icon, for example). The software image may be a still image or a moving image. The software image data may be stored in the storage 22 or stored in another device (such as the equipment 12 or the relay device 14).

The target identification information is, for example, a name of the target, a target ID, information indicating the type of target, an image associated with the target (target image), and the like. For example, in the case in which the target is a file (data), the name or the like of the file (such as an image file or a document file, for example) is used as the target identification information. Also, in the case in which the target is a physical object (such as a product, for example), the name or the like of the object is used as the target identification information. The target image may be an image (still image or moving image) generated by capturing a physical target with an imaging device such as a camera, or an image illustrating the target schematically (such as an icon, for example). The target image data may be stored in the storage 22 or stored in another device (such as the equipment 12 or the relay device 14).

The function information includes, for example, identification information such as a name or ID of a function, and content information indicating the content of the function. Function information related to a lone function includes identification information of the lone function and content information indicating the content of the lone function. Function information related to a link function includes identification information of the link function and content information indicating the content of the link function.

Note that a link function may be a function which is executable by linking multiple different configurations to each other, or a function which is executable by linking the same configuration. A link function may also be a function which is unusable before linkage. For example, by linking a function (printer) including a print function and a function (scanner) including a scan function, it becomes possible to execute a copy function as the link function. In other words, by linking the print function and the scan function, the copy function becomes executable. In this case, the copy function as the link function and the combination of the print function and the scan function are associated.

The conceptual category of a link function may also include a combined function that links multiple pieces of equipment and multiple pieces of software to enable the execution of a new function. For example, by combining multiple displays, an expanded display function may be realized as a combined function. As another example, by combining a TV and a recorder, a video recording function may be realized as a combined function. The video recording function may also be a function that records images displayed on the TV. Also, by combining multiple cameras, an imaging region expansion function may be realized as a combined function. This expansion function is a function of capturing an image by stitching together the imaging regions of the cameras, for example. Also, by combining a telephone with a translation device or translation software, a telephony translation function (a function whereby a conversation over the phone is translated) may be realized as a combined function. In this way, the conceptual category of a link function may also include functions which are achievable by linking multiple pieces of equipment and multiple pieces of software of the same type to each other, and functions which are achievable by linking multiple pieces of equipment and multiple pieces of software of different types to each other.

Note that the function management information may also be stored in a device other than the terminal device 10 (such as the equipment 12 or the relay device 14). In this case, the function management information does not have to be stored in the terminal device 10.

A controller 24 is configured to control the operation of each component of the terminal device 10. For example, the controller 24 executes various programs, controls communication by the communication unit 16, controls the notification of information (such as the display and sound output of information, for example) using the UI unit 18, receives information input into the terminal device 10 using the UI unit 18, and the like. Also, the controller 24 includes a function controller 26.

The function controller 26 is configured to control the notification, execution, and the like of functions. For example, in the case in which multiple functions are selected together, the function controller 26 controls the notification of information. The information is, for example, information related to a function different from the multiple functions, other information, or the like. The function controller 26 may also control the execution of a function different from the multiple functions. For example, in the case in which a first function and a second function are selected together, the function controller 26 controls the notification and execution of a third function. The third function may be a link function which may be executed by utilizing both the first function and the second function, a separate function that does not utilize the first function and the second function, or a function which may be executed by utilizing either the first function or the second function. Obviously, three or more functions may also be selected as the multiple functions. Also, in the case in which a single function is selected, the function controller 26 controls the notification and execution of the function. For the notification of information, the function controller 26 may cause the UI unit 18 to display the information on a display, or output the information as sound. The information may also be displayed on the display of another device, or output as sound from another device.

For example, an image for executing a function is displayed on the display of the UI unit 18. The image corresponds to an example of configuration identification information for identifying a configuration used by the function. In the case in which the function is executed using the equipment 12, the image is an equipment image associated with the equipment 12 (one example of the equipment identification information for identifying the equipment 12). In the case in which the function is executed using software, the image is a software image associated with the software (one example of the software identification information for identifying the software). In the case in which the function is executed using a target (such as a file), the image is a target image associated with the target (one example of the target identification information for identifying the target).

In the case in which an image is selected by the user, the function controller 26 specifies the function associated with the image (configuration identification information) selected by the user in the function management information, and controls the notification and execution of the function.

For example, in the case in which a first image for executing a first function is selected by the user, the function controller 26 specifies the first function corresponding to the first image in the function management information, and controls the notification and execution of the first function. To execute the first function, the configuration (equipment 12, software, or target) associated with the first image is used.

Also, in the case in which a first image for executing a first function and a second image for executing a second function are both selected by the user, the function controller 26 specifies a third function associated with the combination of the first image and the second image in the function management information, and controls the notification and execution of the third function. To execute the third function, for example, the configuration associated with the first image and the configuration associated with the second image are used. Obviously, to execute the third function, a different configuration may also be used, without using the configuration associated with the first image or the configuration associated with the second image. As a different example, the function controller 26 may also control the notification of information other than the third function.

Note that the function controller 26 may also be provided in a device other than the terminal device 10 (such as the equipment 12 or the relay device 14), and the processes by the function controller 26 may be executed by the device other than the terminal device 10.

Hereinafter, the information processing system according to the present exemplary embodiment will be described in further detail.

FIGS. 3 and 4 will be referenced to describe the function management information in detail. FIG. 3 illustrates an example of a lone function management table as the function management information. FIG. 4 illustrates an example of a link function management table as the function management information. In the following, first, the lone function management table will be described with reference to FIG. 3, and then the link function management table will be described next with reference to FIG. 4.

In the lone function management table illustrated in FIG. 3, as an example, an image ID, information indicating a configuration (equipment, software, or target), and information indicating the content of the lone function are associated together. The image ID corresponds to an example of configuration identification information, and more specifically is an ID of an equipment image, an ID of a software image, or an ID of a target image. All or a part of a piece of equipment may be used as the configuration. Also, a specific function of a piece of software may be used as the configuration. Note that the configuration is specified by information on a subordinate concept level (for example, the proper name of the configuration (such as a specific product name, item name, serial number, website name, or URL, for example)). Obviously, the configuration may also be specified by information on a superordinate concept level (such as a common name or general name for the configuration, for example). Hereinafter, each lone function will be described.

A multi-function device A that acts as a piece of equipment 12 is associated with an image A. Lone functions included in the multi-function device A are, for example, a print function, a scan function, a copy function, a facsimile function, and the like.

A PC(B) that acts as a piece of equipment 12 is associated with an image B. Lone functions included in the PC(B) are, for example, a display function, a communication function, and the like.

Document creation software C that acts as a piece of software is associated with an image C. Lone functions included in the document creation software C are, for example, a document creation function, a document display function, and the like. The document creation function is a function for creating and editing document files. The document display function is a function for displaying document files.

A password setting software D that acts as a piece of software is associated with an image D. A lone function included in the password setting software D is a function of setting a password on a file.

A document file E that acts as a target is associated with an image E. Lone functions applied to the document file E are the document creation function, the document display function, and the like. In other words, the document creation software is associated with the document file E, and the functions included in the document creation software are applied to the document file E.

An accounting file F that acts as a target is associated with an image F. Lone functions applied to the accounting file F are an editing function, a display function, and the like. In other words, accounting software is associated with the accounting file F, and the functions included in the accounting software are applied to the accounting file F.

For example, in the case in which the image A being displayed on the display of the UI unit 18 is selected by the user, the function controller 26 specifies the lone functions associated with the image A in the lone function management table, and controls the notification and execution of the lone functions. With this arrangement, information indicating the lone functions included in the multi-function device A may be displayed on the display of the UI unit 18, or the lone functions may be executed.

Similarly, in the case in which the image C is selected by the user, the function controller 26 specifies the lone functions associated with the image C in the lone function management table, and controls the notification and execution of the lone functions. With this arrangement, information indicating the lone functions included in the document creation software C may be displayed on the display of the UI unit 18, or the lone functions may be executed.

Also, in the case in which the image E is selected by the user, the function controller 26 controls the notification and execution of the document creation software associated with the document file E.

Note that the equipment registered in the lone function management table may also be equipment not included in the information processing system. Also, the software and files registered in the lone function management table may be stored in the terminal device 10, stored in the equipment 12, stored in the relay device 14, or stored in a device (such as a server) other than the above.

The lone functions illustrated in FIG. 3 are merely one example, and lone functions other than the above may also be registered in the lone function management table.

In the link function management table illustrated in FIG. 4, as an example, a combination of image IDs, information indicating a configuration (equipment, software, or target), and information indicating the content of the link function are associated together. Hereinafter, each link function will be described.

A "scan forwarding function" and a "print function" are associated with the combination of images A and B as link functions. These link functions are functions which are executable using the multi-function device A associated with the image A and the PC(B) associated with the image B. In other words, these link functions are functions which are executable using a function included in the multi-function device A (corresponding to a first function) and a function included in the PC(B) (corresponding to a second function). The scan forwarding function that acts as a link function is a function that forwards image data generated by a scan by the multi-function device A to the PC(B). The print function that acts as a link function is a function that transmits data (such as a document file or an image file) stored on the PC(B) to the multi-function device A, and prints the data at the multi-function device A.

A "function of turning on an illumination device when the opening of a door is detected" is associated with images G and H as a link function. This link function is a function which is executable using a door open/close sensor G associated with the image G and an illumination device H associated with the image H. In other words, this link function is a function which is executable using a function included in the door open/close sensor G (corresponding to a first function) and a function included in the illumination device H (corresponding to a second function). Note that the door open/close sensor G and the illumination device H correspond to examples of the equipment 12. The door open/close sensor G is a sensor that detects the opening and closing of a door. This link function is a function that turns on the illumination device H when the door open/close sensor G detects the opening of the door. Described in further detail, when the door open/close sensor G detects the opening of the door, information indicating the detection result is transmitted from the door open/close sensor G to the relay device 14. When the relay device 14 receives the information indicating the detection result, the relay device 14 turns on the illumination device H by transmitting information indicating a turn-on instruction to the illumination device H. For example, equipment address information for each of the door open/close sensor G and the illumination device H is stored in the relay device 14, and the relay device 14 transmits and receives information using each piece of equipment address information. Obviously, the terminal device 10 may also execute such control by going through the relay device 14, or by not going through the relay device 14. Also, the door open/close sensor G and the illumination device H may execute the above link function by communicating with each other directly, without going through the relay device 14.

A "function of setting a password on a document file" is associated with the combination of images C and D as a link function. This link function is a function which is executable using the document creation software C associated with the image C and the password setting software D associated with the image D. In other words, this link function is a function which is executable using a function included in the document creation software C (corresponding to a first function) and a function included in the password setting software D (corresponding to a second function). For example, this link function is a function of setting a password by the password setting software D on a document file being edited or displayed by the document creation software C.

A "function of transmitting a document file" is associated with the combination of images C and J as a link function. This link function is a function which is executable using the document creation software C associated with the image C and data transmission software J associated with the image J. In other words, this link function is a function which is executable using a function included in the document creation software C (corresponding to a first function) and a function included in the data transmission software J (corresponding to a second function). This link function is a function of transmitting a document file being edited or displayed by the document creation software C to a destination by the data transmission software J.

A "function of adding the content of a document file to an accounting file" is associated with the combination of images E and F as a link function. This link function is a function applied to the document file E associated with the image E and the accounting file F associated with the image F. In the case in which document creation software is associated with the document file E and accounting software is associated with the accounting file F, this link function is a function which is executable using a function included in the document creation software (corresponding to a first function) and a function included in the accounting software (corresponding to a second function).

The above link functions are functions which are executable using configurations of the same type, but a link function may also be a function which is executable using multiple types of configurations which are different from each other. This point is described in detail below.

A link function which is executable using a piece of equipment 12 and a piece of software is associated with the combination of images A and K. This link function is a "function of applying a character recognition process to a scanned document". This link function is a function which is executable using the multi-function device A (an example of the equipment 12) associated with the image A and character recognition software K (an example of the software) associated with the image K. In other words, this link function is a functions which is executable using a function included in the multi-function device A (corresponding to a first function) and a function included in the character recognition software K (corresponding to a second function). This link function is a function that scans a document with the multi-function device A, and applies a character recognition process to an image generated by the scan with the character recognition software K.

A link function which is executable using a piece of equipment 12 and a file is associated with the combination of images A and E. This link function is a "function of printing a document file". This link function is a function which is executable using the multi-function device A associated with the image A and the document file E associated with the image E. This link function is a function that transmits a document file stored in a storage location to the multi-function device A, and prints the document file with the multi-function device A.

A link function which is executable using a piece of software and a file is associated with the combination of images K and L. This link function is a "function of extracting text from an image file". This link function is a function which is executable using the character recognition software K associated with the image K and an image file L associated with an image L. This link function is a function that applies a character recognition process by the character recognition software K to the image file L.

The above link functions are functions which are executable using two configurations, but a link function may also be a function which is executable using three or more configurations. This point is described in detail below.

For example, a link function which is executable using a scanner as a piece of equipment 12, character recognition software and form creation software as pieces of software, as well as a receipt and an accounting file as files is registered in the link function management table. This link function is a "a function of applying a character recognition process to a scan result when a receipt is scanned by a scanner, and adding the result (the content of the receipt) to an accounting file". Described in detail, this link function is a function that scans a receipt with the scanner and applies a character recognition process by the character recognition software to an image generated by the scan, thereby extracting a character string from the image, and adds the character string to an accounting file with form creation software.

In addition, a link function which is executable using a web browser, a specific shopping site, and information indicating a purchase instruction as pieces of software, as well as a specific designer handbag as a target (shopping target) is registered in the link function management table. This link function is a "function of launching the web browser, and purchasing a specific designer handbag when the handbag is up for sale on a specific shopping site". Described in detail, this link function is a function of monitoring the specific shopping site with the web browser, and when the specific designer handbag becomes available for sale on the shopping site, executing a process of purchasing the designer handbag.

The link functions illustrated in FIG. 4 are merely one example, and link functions other than the above may also be registered in the link function management table. For example, a link function may also be a function which is executable using Internet of Things (IoT) equipment. In addition, link functions may also be used in a connected home (a system in which IoT technology is used to interconnect equipment such as home appliances over a network). In this case, equipment may be interconnected by going through a specific server, or equipment may be interconnected without going through a specific server.

Additionally, multiple configurations may execute a link function by linking through If This Then That (IFTTT). In other words, the content of the link function is such that when a phenomenon acting as a trigger occurs in a certain configuration, another configuration executes an action (process). For example, a link function which is executable using the door open/close sensor G and the illumination device H is a function that executes the action of turning on the illumination device H when triggered by the detection of the opening of the door by the door open/close sensor G. Also, the link function that executes the designer handbag purchase process is a function that executes the action of purchasing a specific designer handbag when triggered by that designer handbag becoming available for sale. Also, a function in which an action by a certain configuration acts as a different trigger by which yet another configuration executes an action may also be included in the category of a link function according to the present exemplary embodiment. Also, a function that links multiple web services or an API link that links multiple systems, services, and the like by utilizing an application programming interface (API) may also be included in the category of a link function according to the present exemplary embodiment.

Note that the equipment 12 that executes a function may be controlled by the relay device 14 or controlled by the terminal device 10. In the case in which the equipment 12 is controlled by the relay device 14, the relay device 14 controls the equipment 12 by transmitting a control signal for controlling the operation of the equipment 12 to that equipment. In the case in which the equipment 12 is controlled by the terminal device 10, the terminal device 10 controls the equipment by transmitting the control signal directly to the equipment 12, or alternatively, by transmitting the control signal to the equipment 12 through the relay device 14. The relay device 14 may also transmit a control signal to another relay device, and the other relay device may control the equipment 12. A control signal may also be transmitted from the relay device 14 to a server, and the server may control the equipment 12.

As for hardware, a part of the equipment 12 may be used. For example, in the case in which the equipment 12 includes multiple functions, and a function is assigned to each part of the equipment 12, a lone function or a link function which is executable by using part of the equipment 12 may be defined. To describe by giving a specific example, assume that a print function is assigned to a main unit of a multi-function device, a scan function is assigned to a reading unit (for example, the part corresponding to a document cover, document glass, and automatic document feeder) of the multi-function device, and a post-processing function (such as a stapler function, for example) is assigned to a post-processing device of the multi-function device. In the case of using the scan function, the reading unit of the multi-function device may be used as the configuration. Also, as for software, sets of functions collected into block units, such as robotics process automation (RBA) or the like, may be used.

Hereinafter, a process by the information processing system according to the present exemplary embodiment will be described by citing a specific example.

Figure 5:
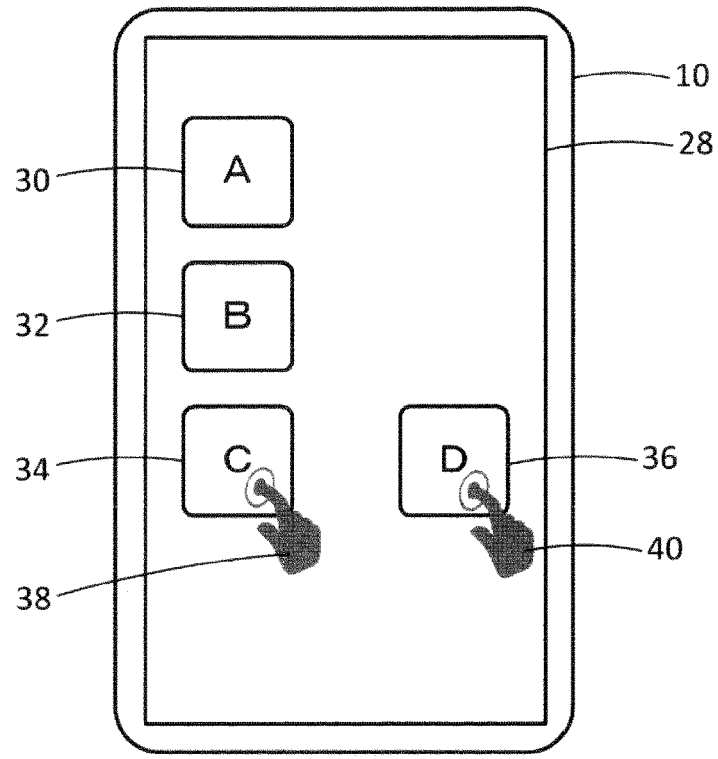
FIG. 5 is a diagram illustrating a screen.

FIG. 5 illustrates a screen 28 displayed on the display of the UI unit 18. For example, the screen 28 corresponds to what is called a home screen or a desktop screen. On the screen 28, images 30, 32, 34, and 36 for executing functions are displayed. For example, the image 30 is an equipment image associated with the multi-function device A as a piece of equipment 12. The image 32 is an equipment image associated with the PC(B) as a piece of equipment 12. The image 34 is a software image associated with the document creation software C as a piece of software. The image 36 is a software image associated with the password setting software D as a piece of software.

For example, in the case in which the user selects a single image, the function controller 26 specifies the lone function associated with the image in the lone function management table (see FIG. 3), and controls the notification and execution of the lone function. Also, in the case in which the user selects multiple images, the function controller 26 specifies the link function associated with the combination of multiple images in the link function management table (see FIG. 4), and controls the notification and execution of the link function. Hereinafter, selecting a single image is designated "single-selection", and selecting multiple images is designated "multi-selection".

For example, one or multiple images may be selected by a touch operation on the screen 28. Hereinafter, selecting a single image by a touch operation is designated "single-touch", and selecting multiple images by a touch operation is designated "multi-touch".

Hereinafter, single-touch will be described. For example, in the case in which the screen 28 is configured by a touch panel, when an object such as the user's finger, a stylus, or a pen contacts the display portion of a single image on the screen 28, the detector 20 detects the contact. Also, in the case in which the object moves away from the display portion on the screen 28, the detector 20 detects the moving away of the object from the display portion on the screen 28. As an example, in the case in which the detector 20 detects both the contact of an object with respect to a display portion and the moving away of the object from the display portion, the function controller 26 recognizes that the image has been selected by the user. In other words, by an object contacting the display portion of a single image on the screen 28, and then by the object moving away from the display portion, the function controller 26 recognizes that a single-touch with respect to the image is valid. In this case, the function controller 26 controls the notification and execution of the lone function associated with the image.

As a different example, in the case in which the detector 20 detects that an object has been contacting the display portion of a single image over a predetermined time or greater, the function controller 26 may recognize that the image has been selected by the user. In other words, the function controller 26 recognizes that a single-touch with respect to the image is valid.

Note that a single image may also be selected not by a touch operation, but by a mouse operation, key operation, or the like by the user.

Hereinafter, multi-touch will be described. In the case in which objects such as the user's finger, a stylus, or a pen are contacting the display portion of a certain image on the screen 28 while also contacting the display portion of a different image on the screen 28, the detector 20 detects these contacts. Also, in the case in which the objects move away from each display portion on the screen 28, the detector 20 detects the moving away of the objects from each display portion on the screen 28. As an example, in the case in which the detector 20 detects both the contact of objects with respect to a display portion on each of two images and the moving away of the objects from each display portion, the function controller 26 recognizes that the two images both have been selected by the user. In other words, by objects contacting each display portion of two images on the screen 28, and then by the objects moving away from each display portion, the function controller 26 recognizes that a multi-touch with respect to the two images is valid. In this case, the function controller 26 controls the notification and execution of the link function associated with the combination of the two images. Note that touch operations with respect to three or more images are similar.

The conceptual category of selecting multiple images together may include selecting multiple images simultaneously, and selecting multiple images together over a predetermined time even with a gap between the time of starting and ending the selection, without selecting the multiple images completely simultaneously. When described by taking a touch operation as an example, the conceptual category of multi-touch may include objects contacting each display portion of each of multiple images simultaneously, and an object or objects contacting each display portion together over a predetermined time even with a gap between the time of starting and ending the contact, without contacting each display portion completely simultaneously.

As a different example, in the case in which the detector 20 detects that an object has been contacting each display portion of multiple images over a predetermined time or greater, the function controller 26 may recognize that the multiple images have been selected together by the user. In other words, the function controller 26 recognizes that a multi-touch with respect to the multiple images is valid.

As yet another example, in the case in which multiple images are selected within a predetermined limited time, the function controller 26 may recognize that the multiple images have been selected together by the user. For example, the function controller 26 may define the time point at which a touch operation is performed on an initial image as a start time point, and recognize that one or multiple images on which a touch operation is performed within a limited time from the start point, as well as the initial image, have been selected together by the user. Note that in each touch operation, the object may move away from the display portion of the image, or the contact of the object on the display portion may be ongoing. For example, in the case in which an object contacts the display portion of an initial image, moves away from the display portion, contacts the display portion of a next image within a limited time, and then moves away from the display portion, the function controller 26 may recognize that the initial image and the next image have been selected together by the user. Obviously, even in the case in which an object makes ongoing contact with each display portion, the function controller 26 may recognize that the initial image and the next image have been selected by the user. In the case in which a touch operation is performed on only a single image within the limited time, the function controller 26 recognizes that only the single image has been selected by the user. That is, the function controller 26 recognizes that a single-touch with respect to the single image is valid. In other words, in the case in which a touch operation is performed on only a single image within the limited time, until the limited time elapses, a single-touch with respect to the single image is not confirmed as valid, and at the point in time at which the limited time elapses, the single-touch is confirmed as valid. Note that in the case in which multiple images are selected within a limited time not by a touch operation, but by a mouse operation, key operation, or the like by the user, the detector 20 may recognize that the multiple images have been selected together.

Hereinafter, the process when a single-touch is performed will be described by citing a specific example. As illustrated in FIG. 5, in the case in which a finger 38 of a user contacts the display portion of the image 34 on the screen 28, and then the finger 38 moves away from the display portion, the detector 20 detects the contact and the moving away. With this arrangement, the function controller 26 detects that the image 34 has been selected by the user, specifies the document creation software C associated with the image 34 in the lone function management table, and launches the document creation software C. Obviously, the image 34 may also be selected by a mouse operation, key operation, or the like.

Figure 6:
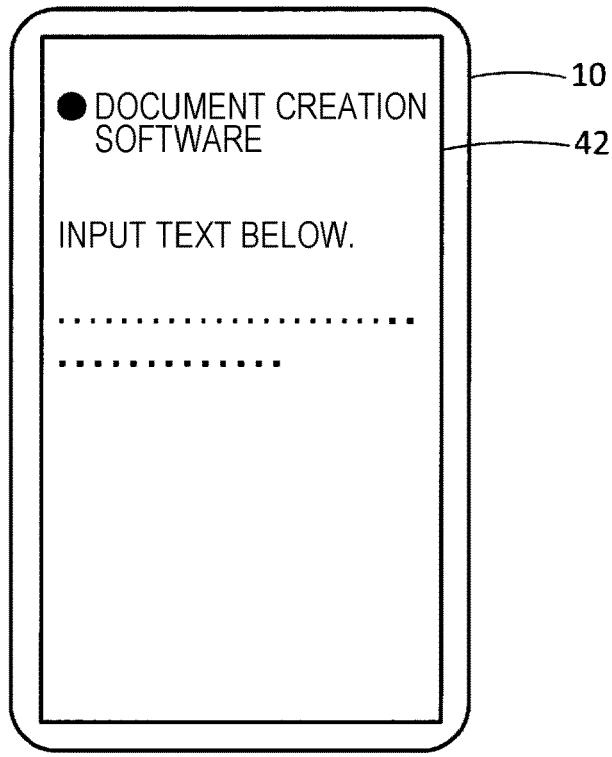
FIG. 6 is a diagram illustrating a screen.

For example, as illustrated in FIG. 6, the function controller 26 causes the UI unit 18 to display a screen 42 related to the document creation software C. The user, by using the document creation software C, is able to create, edit, and display documents on the screen 42 and the like. Note that, instead of launching the document creation software C, the function controller 26 may also cause the UI unit 18 to display information indicating that the document creation software C has been selected, or cause the UI unit 18 to display information indicating a lone function which is executable using the document creation software C.

Hereinafter, the process when a multi-touch is performed will be described by citing a specific example. As illustrated in FIG. 5, in the case in which the finger 38 of the user contacts the display portion of the image 34 on the screen 28, while in addition, a finger 40 of the user contacts the display portion of the image 36 on the screen 28, and after that, the fingers 38 and 40 move away from each display portion, the detector 20 detects these contacts and the moving away. With this arrangement, the function controller 26 detects that the images 34 and 36 have been selected by the user, specifies the link function "function of setting a password on a document file" associated with the combination of the images 34 and 36 in the link function management table, and controls the notification and execution of the link function. This link function is a function which is executable using the document creation software C associated with the image 34 and the password setting software D associated with the image 36.

Note that the images 34 and 36 do not have to be selected at exactly the same timing. For example, even in the case in which the finger 38 contacts the display portion of the image 34, and while the contact is ongoing, the finger 40 contacts the display portion of the image 36, and after that, at the same timing or at different timings, the fingers 38 and 40 move away from each display portion, the function controller 26 may recognize that the images 34 and 36 have been selected together. Even in this case, the function controller 26 controls the notification and execution of the link function associated with the combination of the images 34 and 36. Note that while the finger 38 is contacting the display portion of the image 34, the touch operation on the image 34 is not recognized as a single-touch.

Also, in the case in which the finger 38 is contacting the display portion of the image 34 while the finger 40 is contacting the display portion of the image 36 over a predetermined time or more, the function controller 26 may recognize that the images 34 and 36 have been selected together.

Also, in the case in which the finger 38 contacts the display portion of the image 34, and within a limited time from the time point of the contact, the finger 40 contacts the display portion of the image 36, the function controller 26 may recognize that the images 34 and 36 have been selected together. In this case, the function controller 26 does not recognize the finger 38 on the display portion of the image 34 as a single-touch with respect to the image 34. In the case in which a touch operation is performed on only the display portion of the image 34 within the limited time, the function controller 26 recognizes the touch operation as a single-touch with respect to the image 34. Note that, within the limited time, the contact of the fingers 38 and 40 may be ongoing, or the fingers 38 and 40 may move away from each display portion. Note that even in the case in which the images 34 and 36 are selected within the limited time by a mouse operation, key operation, or the like, the function controller 26 may control the notification and execution of the link function associated with the combination of the images 34 and 36.

Figure 7:
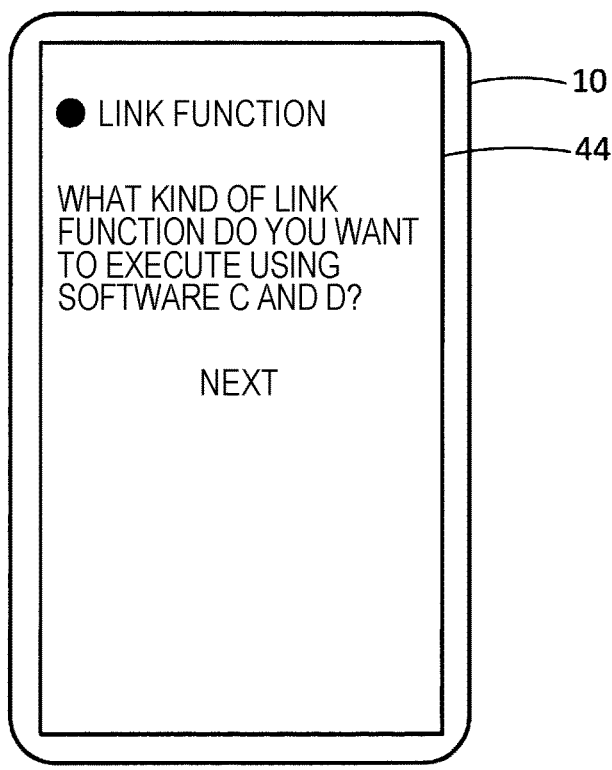
FIG. 7 is a diagram illustrating a screen.

For example, as illustrated in FIG. 7, the function controller 26 causes the UI unit 18 to display a screen 44 related to the link function. For example, the function controller 26 causes information indicating the link function associated with the combination of the images 34 and 36 to be displayed on the screen 44. The information indicating the link function is information indicating the name, content, and the like of the link function, for example. In the case in which the user operates the UI unit 18 to give an instruction to execute the link function, the function controller 26 executes the link function. Specifically, the function controller 26 launches the document creation software C and the password setting software D, and causes the software to execute the link function.

In addition, on the screen 44, the user may set a link function which is executable using the document creation software C associated with the image 34 and the password setting software D associated with the image 36. The link function set by the user is registered in the link function management table, and the link function may be executed.

Note that in the examples illustrated from FIGS. 5 to 7, an image associated with a piece of software is selected by the user, and the software is used for a lone function or a link function, but an image associated with a piece of equipment 12 or an image associated with a file may also be selected by the user, and the equipment 12 or the file may be used for a lone function or a link function.

As above, according to the present exemplary embodiment, in the case in which a single image is selected, the notification and execution of a lone function are controlled, whereas in the case in which multiple images are selected together, the notification and execution of a link function are controlled. With this arrangement, the user is able to switch between using a lone function and using a link function with a simple operation.

Note that even in the case in which multiple images are selected together, if an executable link function is not available by the combination of the functions associated with each of the selected images, a link function is not included in a notification, and in addition, a link function is not executed.

Hereinafter, exemplary modifications will be described.

Exemplary Modification 1

Exemplary Modification 1 will be described. In Exemplary Modification 1, in the case in which multiple images are selected together by the user, the function controller 26 controls the notification and execution of a lone function or a link function that does not utilize the functions associated with each of the multiple images.

Exemplary Modification 1 will be described in detail with reference to FIG. 5. In Exemplary Modification 1, a lone function or a link function that does not use the document creation software C and the password setting software D is associated with the combination of the images 34 and 36, and information indicating the association is registered in the lone function management table or the link function management table according to Exemplary Modification 1.

Note that the lone function or link function may be set by a user, an administrator, or the like, for example. For example, a user may associate a lone function or a link function desired by the user with the combination of the images 34 and 36. The association may also be changed by the user.

For example, a function of displaying a help screen indicating how to use a function, configuration, or the like, a function of displaying a manual screen indicating a manual, or the like is associated with the combination of the images 34 and 36. These screen display functions are functions which do not use the document creation software C or the password setting software D. In the case in which the images 34 and 36 are selected together by the user, the function controller 26 causes the UI unit 18 to display the help screen or manual screen. On the help screen or manual screen, the usage and manual of the document creation software C and the password setting software D may be displayed, or the usage and manual of a different piece of software or equipment 12 may be displayed.

As another example, a function that launches a controller of a different piece of equipment 12 or software by a remote operation may be associated with the combination of the images 34 and 36. In the case in which the images 34 and 36 selected together by the user, the function controller 26 launches the controller. In addition, the function controller 26 may cause the UI unit 18 to display a screen for the controller.

As yet another example, in the case in which multiple images are selected together by the user, the function controller 26 may cause the UI unit 18 to display a screen for providing guidance to the user about a different function.

Even in Exemplary Modification 1, in the case in which a single image is selected by the user, the function controller 26 controls the notification and execution of the function associated with the image.

In the above example, an image associated with a piece of software is selected by the user, but a process similar to the above is also performed in the case in which an image associated with a piece of equipment 12 or an image associated with a file is selected by the user. In this case, the equipment 12 or file may be used in a lone function or a link function, or software may be used in a lone function or a link function.

According to Exemplary Modification 1, the user is able to use different functions with a simple operation.

Exemplary Modification 2

Exemplary Modification 2 will be described. In Exemplary Modification 2, in the case in which multiple images are selected together by the user, the function controller 26 uses a function or functions associated with at least one of the multiple images, and controls the notification and execution of a link function which is executable without using the function or functions associated with the other image or images.

Exemplary Modification 2 will be described in detail with reference to FIG. 5. In Exemplary Modification 2, a link function which is executable using a piece of software other than the document creation software C and the password setting software D is associated with the combination of the images 34 and 36, and information indicating the association is registered in the link function management table according to Exemplary Modification 2. In the case in which the images 34 and 36 are selected together by the user, the function controller 26 controls the notification and execution of the link function.

Note that the link function may be set by a user, an administrator, or the like, for example. For example, a user may associate a link function desired by the user with the combination of the images 34 and 36. The association may also be changed by the user. Also, the above function or functions associated with at least one of the images may be set by a user, an administrator, or the like, for example. For example, from the images 34 and 36, the user may select the image associated with a piece of software desired by the user as the image associated with the piece of software to be used in the link function. The image associated with the function used in the link function may also be changed by the user. Also, the configuration (equipment 12, software, target) used in a link function together with the above function or functions associated with at least one of the images may be set by a user, an administrator, or the like, for example.

Even in Exemplary Modification 2, in the case in which a single image is selected by the user, the function controller 26 controls the notification and execution of the function associated with the image.

In the above example, an image associated with a piece of software is selected by the user, but a process similar to the above is also performed in the case in which an image associated with a piece of equipment 12 or an image associated with a file is selected by the user.

According to Exemplary Modification 2, the user is able to use different functions with a simple operation.

Exemplary Modification 3

Exemplary Modification 3 will be described. In Exemplary Modification 3, in the case in which multiple images are selected by the user on the screen of an application (software), the function controller 26 controls the notification of information and the execution of functions.

Figure 8:
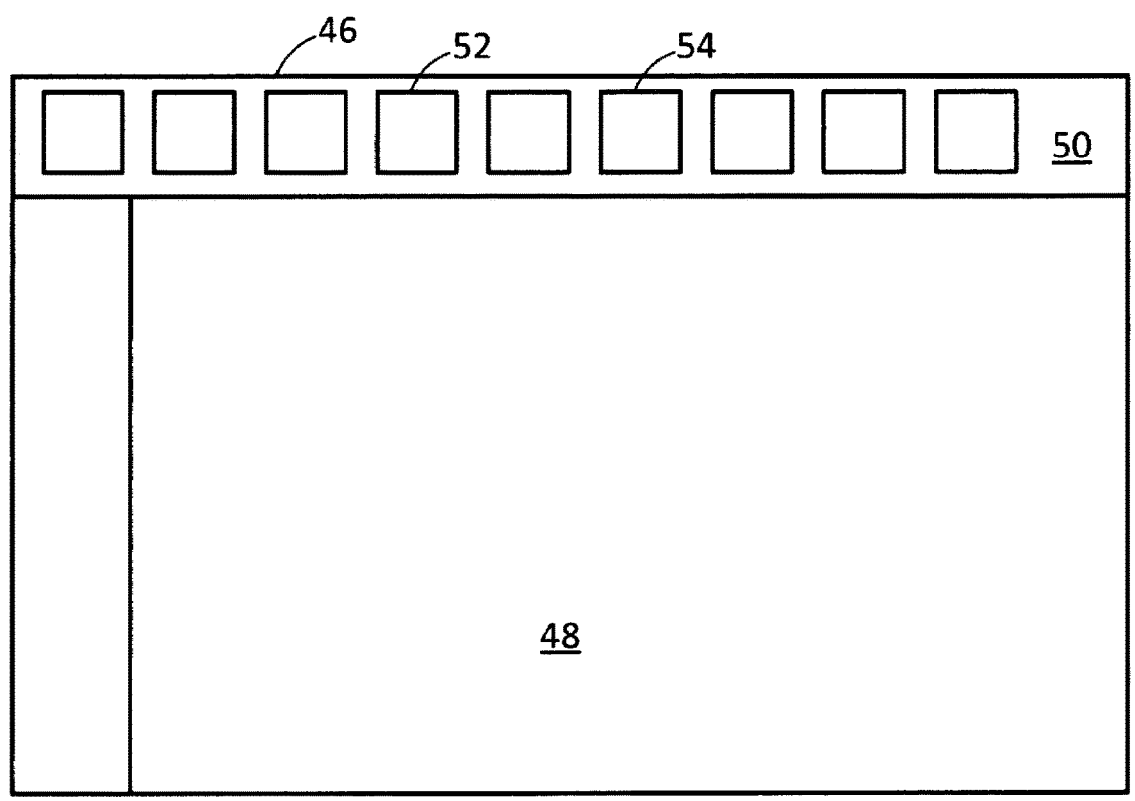
FIG. 8 is a diagram illustrating an application screen.
Figure 9:
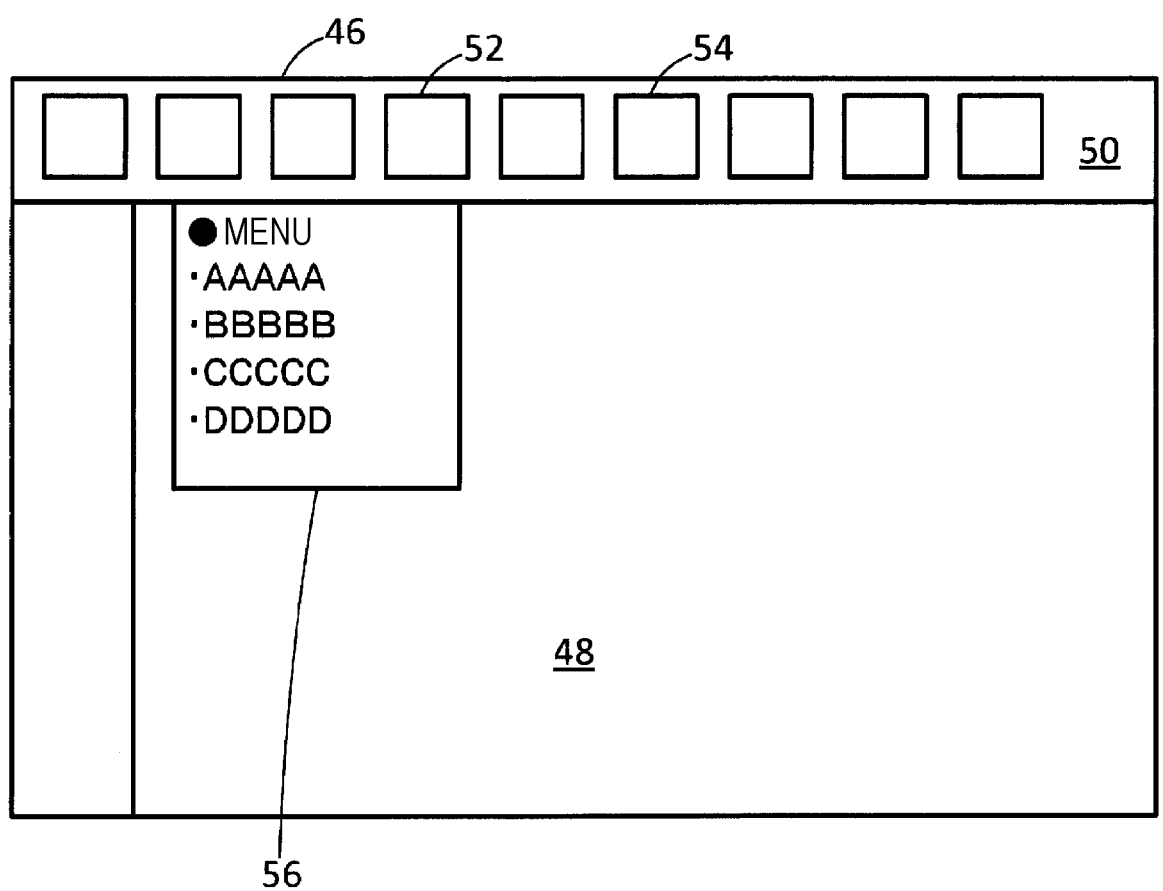
FIG. 9 is a diagram illustrating an application screen.

Hereinafter, Exemplary Modification 3 will be described in detail with reference to FIGS. 8 and 9. FIGS. 8 and 9 illustrate an example of an application screen. In the case in which the user operates the UI unit 18 to give an instruction to launch an application, the controller 24 launches the application and causes the display of the UI unit 18 to display an application screen 46. The application screen 46 is a screen display in association with the execution of an application, and is a screen for using functions included in the application to display a file (data), perform work on the file, and the like.

For example, the application screen 46 includes a work area 48 and a command area 50. The work area 48 is an area in which a file to be displayed or worked on is displayed. The command area 50 is an area in which images (for example, icons) associated with various commands are displayed. The commands are processes applied to a file, settings of the applications, other processes and settings, and the like. For example, in the case in which the document creation software is launched, the document file to be worked on (to be edited) is displayed in the work area 48, and images associated with commands related to document creation and the like are displayed in the command area 50. Since commands are functions executed by an application (for example, the document creation software), an image associated with a command corresponds to an example of an image associated with a function.

A first function is associated with an image 52 displayed inside the command area 50, and a second function is associated with an image 54. When described by taking the document creation software as an example, the first function is an Add Diagram function that adds a diagram to a document file, while the second function is an Add Equation function that adds an equation to the document file. In the case in which the user operates the UI unit 18 to select the image 52, the first function (for example, the Add Diagram function) associated with the image 52 is executed. The same applies to images associated with other commands.

For example, in the case in which the user selects the images 52 and 54 together, the function controller 26 controls the notification of information associated with the combination of the images 52 and 54, and controls the execution of a lone function or a link function associated with the combination. As an example, a function of displaying a selection menu for selecting different functions (lone functions or link functions) is associated with the combination of the images 52 and 54, and information indicating the association is registered in the lone function management table and the link function management table according to Exemplary Modification 3. In the case in which the images 52 and 54 are selected together by the user, the function controller 26 causes the UI unit 18 to display the selection menu.

For example, as illustrated in FIG. 9, the function controller 26 causes a selection menu 56 to be displayed on the application screen 46. For example, the selection menu 56 may be displayed by a pop-up display. In the selection menu 56, a list of third functions different from the first and second functions above is displayed. The third functions may be link functions which are executable using the first function and the second function, link functions which are executable using either the first function or the second function, lone functions or link functions which do not use the first function and the second function, or functions related to the application (for example, document creation software). As a different example, the third functions may be functions of displaying a help screen related to the first function and the second function.

In the example illustrated in FIG. 9, information such as the function "AAAAA" is displayed in the selection menu 56. In the case in which a function is selected by the user from the selection menu 56, the function controller 26 executes the function selected by the user.

Even in Exemplary Modification 3, in the case in which a single image displayed on the application screen 46 is selected by the user, the function controller 26 controls the notification and execution of the function associated with the image.

According to Exemplary Modification 3, even on the application screen, the user is able to use different functions with a simple operation.

In the above example, multiple images are selected on the application screen, but in the case in which an image associated with a piece of equipment 12 or a file is selected by the user, a screen related to the piece of equipment 12 or the file may be displayed, and multiple images may be selected on that screen.

Exemplary Modification 4

Exemplary Modification 4 will be described. In Exemplary Modification 4, in the case in which multiple images are selected together by a multi-selection (multi-touch), the function controller 26 changes the information to be included in a notification and the function to be executed, depending on the order in which each image included among the multiple images is selected. For example, the function controller 26 may change the function (lone function or link function) depending on the order, and control the notification and execution of the function, or the function controller 26 may change a help screen, manual screen, or the like depending on the order, and control the notification of the information therein. Hereinafter, Exemplary Modification 4 will be described in detail.

Herein, a process in the case of changing a link function depending on the above order will be described. FIG. 10 illustrates an example of the link function management table according to Exemplary Modification 4. In the link function management table, a combination of multiple image IDs, information indicating a configuration (equipment 12, software, or target) used in a link function, and information indicating the content of the link function corresponding to a selection order of images are associated together.

For example, a "scan forwarding function" and a "print function" are associated with the combination of the images A and B as link functions which are executable using the multi-function device A associated with the image A and the PC(B) associated with the image B. Also, a priority ranking corresponding to the selection order of images is associated with each link function. For example, in the case in which each image is selected in the order of image A, B, the priority ranking of the scan forwarding function becomes "1st", and the priority ranking of the print function becomes "2nd". On the other hand, in the case in which each image is selected in the order of image B, A, the priority ranking of the print function becomes "1st", and the priority ranking of the scan forwarding function becomes "2nd".

The function controller 26 may issue a notification of information related to each link function in accordance with the priority ranking, a notification of information related to the link function having the highest priority ranking (the link function ranked 1st), or a notification of information related to link functions of a predetermined rank or higher. For example, the information is displayed on the display of the UI unit 18. Additionally, the function controller 26 may also execute the link function having the highest priority ranking.

In addition, a "function of adding a character string recognized by the character recognition software K to an accounting file by the form creation software M" and a "function of applying a character recognition process by the character recognition software K to an accounting file currently being edited (created) by the form creation software M" are associated with the combination of the images K and M as link functions which are executable using the character recognition software K associated with the image K and the form creation software M associated with the image M. Similarly to the images A and B, a priority ranking corresponding to the selection order of the images K and M is associated with each link function.

In addition, a "function of adding the content of the document file E to the accounting file F" and a "function of adding the content of the accounting file F to the document file E" are associated with the combination of the images E and F as link functions which are executable using the document file E associated with the image E and the accounting file F associated with the image F.

For example, a link function in which the functions associated with each of the images are executed in the order following the selection order of the images is defined as the link function having the highest priority ranking (the link function ranked 1st).

When described by taking the link functions associated with the images A and B as an example, the scan forwarding function is a function in which a function included in the multi-function device A associated with the image A is executed first, and then a function included in the PC(B) associated with the image B is executed next. When described in detail, first, image data is generated by executing the scan function included in the multi-function device A associated with the image A, and next, by executing a receiving function included in the PC(B) associated with the image B, an image file forwarded from the multi-function device A is received by the PC(B). In other words, the scan forwarding function is a function in which the functions associated with the images A and B are executed in that order. Accordingly, the scan forwarding function is defined as the link function ranked 1st when the images are selected in the order of image A, B.

Also, the print function is a function in which a function included in the PC(B) associated with the image B is executed first, and then a function included in the multi-function device A associated with the image A is executed next. When described in detail, first, by executing a transmitting function included in the PC(B) associated with the image B, image data is transmitted from the PC(B) to the multi-function device A, and next, the image data is printed by the print function included in the multi-function device A associated with the image A. In other words, the print function is a function in which the functions associated with the images B and A are executed in that order. Accordingly, the print function is defined as the link function ranked 1st when the images are selected in the order of image B, A.

Note that the selection order of images may also be considered to correspond to the order of the pieces of equipment 12 that process data, or the transmission destination of data. In other words, when described by taking the scan forwarding function as an example, since data is processed in the order of the multi-function device A, the PC(B), the scan forwarding function is defined as the link function ranked 1st when the images are selected in the order of image A, B. Also, since data is forwarded from the multi-function device A to the PC(B), the scan forwarding function is defined as the link function ranked 1st when the images are selected in the order of image A, B. The same applies to the print function. By adopting such correspondence relationships, the probability of the user's intention and the link function being in agreement may become higher. In other words, the user selects each image in consideration of the order of the pieces of equipment 12 or the transmission destination of data in some cases. In such cases, by adopting the above correspondence relationships, the probability of the user's intention and the link function being in agreement becomes higher. Note that the same applies to the link functions below. In other words, the selection order of images may also be considered to correspond to the order of the pieces of software that process data, or the order in which files are processed.

As a different example, when described by taking link functions associated with the images K and M as an example, the link function "function of adding a recognized character string to an accounting file" is a function in which a function included in the character recognition software K associated with the image K is executed first, and a function included in the form creation software M associated with the image M is executed next. When described in detail, first, a character string is extracted by executing the character recognition function included in the character recognition software K associated with the image K, and next, by executing an editing function included in the form creation software M associated with the image M, the character string is added to an accounting file being edited. In other words, the link function is a function in which the functions associated with the images K and M are executed in that order. Accordingly, the above link function is defined as the link function ranked 1st when the images are selected in the order of image K, M.

Also, the link function "function of applying a character recognition process to an accounting file" is a function in which a function included in the form creation software M associated with the image M is executed first, and then a function included in the character recognition software K associated with the image K is executed next. When described in detail, first, by executing a display function included in the form creation software M associated with the image M, an accounting file to be displayed is displayed, and next, by executing the character recognition function included in the character recognition software K associated with the image K, a character string is extracted from the accounting file. In other words, the link function is a function in which the functions associated with the images M and K are executed in that order. Accordingly, the above link function is defined as the link function ranked 1st when the images are selected in the order of image M, K.

The same applies to the images E and F. In other words, the order of processing the files associated with each of the images E and F is changed depending on the selection order of the images E and F. In the case in which the images are selected in the order of image E, F, a link function that processes the files in the order of the document file E, the accounting file F is selected as the link function ranked 1st. Also, in the case in which the images are selected in the order of image F, E, a link function that processes the files in the order of the accounting file F, document file E is selected as the link function ranked 1st.

Figure 11:
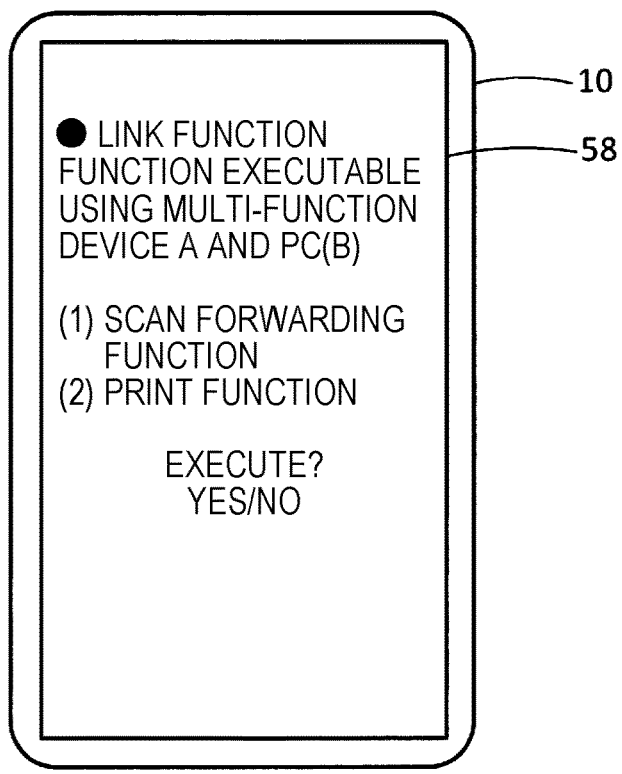
FIG. 11 is a diagram illustrating a screen.
Figure 12:
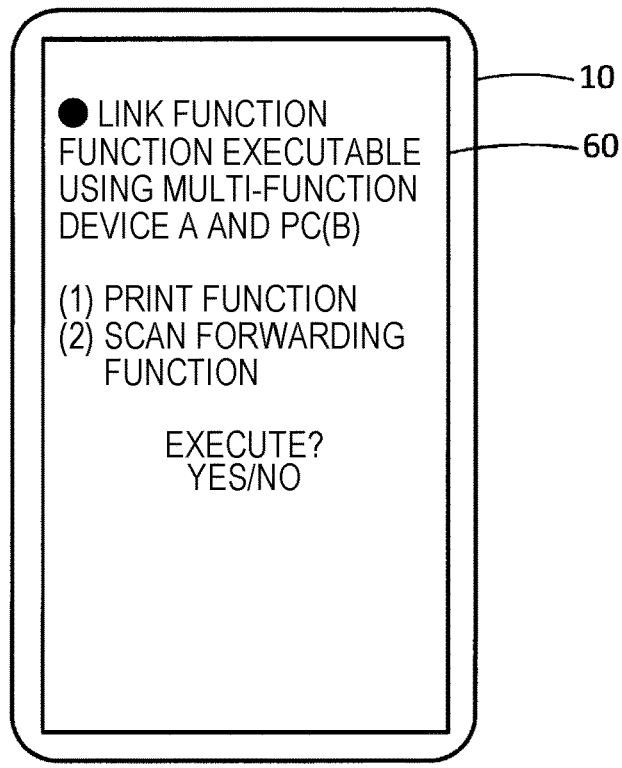
FIG. 12 is a diagram illustrating a screen.

Hereinafter, FIGS. 11 and 12 will be referenced to describe an exemplary notification of link functions. FIGS. 11 and 12 illustrate an example of a screen on which information related to link functions is displayed. For example, in the case in which the images are selected in the order of image A, B, the function controller 26 causes the display of the UI unit 18 to display information related to the scan forwarding function prioritized over (for example, ranked higher than) information related to the print function. For example, as illustrated in FIG. 11, the function controller 26 causes the display to display a screen 58, causes information related to the "scan forwarding function" to be displayed on the screen 58 as the link function ranked 1st, and causes information related to the "print function" to be displayed on the screen 58 as the link function ranked 2nd. In the case in which the user operates the UI unit 18 to give instructions to select and execute a link function (for example, in the case of pressing a "Yes" button), the function controller 26 executes the selected link function. For example, in the case in which the scan forwarding function is selected by the user and an execute instruction is given, the function controller 26 executes the scan forwarding function.

Also, in the case in which the images are selected in the order of image B, A, the function controller 26 causes the display of the UI unit 18 to display information related to the print function prioritized over (for example, ranked higher than) information related to the scan forwarding function. For example, as illustrated in FIG. 12, the function controller 26 causes the display to display a screen 60, causes information related to the "print function" to be displayed on the screen 60 as the link function ranked 1st, and causes information related to the "scan forwarding function" to be displayed on the screen 60 as the link function ranked 2nd.

According to Exemplary Modification 4, depending on the selection order of images, information or functions to be included in a notification may be changed, and the function to be executed may be changed.

Note that in the above example, the notification and execution of link functions are controlled, but a lone function targeted for notification and execution may also be changed, and the information to be included in a notification (such as a help screen or a manual screen, for example) may also be changed depending on the selection order of images.

Exemplary Modification 5

Exemplary Modification 5 will be described. In Exemplary Modification 5, the function controller 26 changes the information to be included in a notification and the function to be executed depending on the length of time during which multiple images are selected together. For example, the function controller 26 may change the function (lone function or link function) depending on the length of time, and control the notification and execution of the function, or the function controller 26 may change a help screen, manual screen, or the like depending on the length of time, and control the notification of the information therein. Hereinafter, Exemplary Modification 5 will be described in detail.

Herein, a process in the case of changing a link function depending on the length of time will be described. FIG. 13 illustrates an example of the link function management table according to Exemplary Modification 5. In the link function management table, a combination of multiple image IDs, information indicating a configuration (equipment 12, software, or target) used in a link function, information indicating a selection time, and information indicating the content of the link function are associated together.

The selection time is the time during which multiple images continue to be selected together. In a touch operation, the selection time is a time (touch time) during which objects continue to contact the respective display portions of multiple images. In the case in which the selection with respect to at least one of the multiple images is canceled, or in other words, in the touch operation, in the case in which an object moves away from the display portion of at least one image, the function controller 26 does not recognize that the multiple images are still being selected together.

In the example illustrated in FIG. 13, levels corresponding to lengths of the selection time are defined. Level 1 corresponds to the shortest selection time, and Level 2 corresponds to a selection time that is longer than Level 1. In this way, as the level number increases, a longer selection time is associated.

For example, the "scan forwarding function", the "print function", and an "other function" are associated with the combination of the images A and B as link functions which are executable using the multi-function device A associated with the image A and the PC(B) associated with the image B. Note that the other function does not have to be associated. Level 1 is associated as the selection time with the scan forwarding function, and Level 2 is associated as the selection time with the print function.

In the case in which objects such as fingers contact the display portion of each of the images A and B, and within the selection time corresponding to Level 1, the objects move away from each display portion (the case in which an object moves away from at least one display portion is also acceptable), the function controller 26 issues a notification of information related to the scan forwarding function or executes the scan forwarding function corresponding to Level 1. In addition, the function controller 26 may cause the display of the UI unit 18 to display information related to the scan forwarding function corresponding to Level 1 prioritized over (for example, ranked higher than) information related to link functions (for example, the print function) corresponding to levels other than Level 1. For example, as illustrated in FIG. 11, the function controller 26 may cause the display to display information related to the "scan forwarding function" as the link function ranked 1st, and cause the display to display information related to the "print function" as the link function ranked 2nd.

In addition, in the case in which objects contact the display portion of each of the images A and B, and within the selection time corresponding to Level 2, the objects move away from each display portion, the function controller 26 issues a notification of information related to the print function or executes the print function corresponding to Level 2. In addition, the function controller 26 may cause the display of the UI unit 18 to display information related to the print function corresponding to Level 2 prioritized over (for example, ranked higher than) information related to link functions (for example, the scan forwarding function) corresponding to levels other than Level 2. For example, as illustrated in FIG. 12, the function controller 26 may cause the display to display information related to the "print function" as the link function ranked 1st, and cause the display to display information related to the "scan forwarding function" as the link function ranked 2nd.

The same process as above is also executed with respect to the images K and M associated with pieces of software, the images E and F associated with files, and the like.

According to Exemplary Modification 5, depending on the selection time of multiple images, information or functions to be included in a notification may be changed, and the function to be executed may be changed.

Note that in the above example, the notification and execution of link functions are controlled, but a lone function targeted for notification and execution may also be changed, and the information to be included in a notification (such as a help screen or a manual screen, for example) may also be changed depending on the length of the selection time.

Exemplary Modification 6

Exemplary Modification 6 will be described. In Exemplary Modification 6, in the case in which each of multiple images is selected together by different users, the function controller 26 controls the notification of information and the execution of functions. The content of the information and functions is the same as the content according to the exemplary embodiments and exemplary modifications described above.

For example, by applying an authentication process, the controller 24 identifies a user selecting an image. For example, a fingerprint authentication process, a face authentication process, or a voice authentication process is used as the authentication process. For example, before selecting an image, multiple users are authenticated by the authentication process, and after that, in the case in which multiple images are selected by the users, the function controller 26 may recognize that multiple images have been selected together by the multiple users, and control the notification of information and the execution of functions.

If it is possible to execute fingerprint authentication on the screen of the display, the controller 24 may also identify a user by applying a fingerprint authentication process to the finger of the user contacting the display portion of an image. The function controller 26 utilizes the result of the authentication process to determine whether or not each of the multiple images is being selected together by different users.

As a different example, when a user is selecting an image, the controller 24 may cause the display of the UI unit 18 to display a user list. If the user selects oneself from the list, the controller 26 recognizes the selected user as the user who is selecting an image.

Note that even in the case in which the same user selects two or more images included among multiple images together, and another user selects one or more images included among the multiple images, the function controller 26 may recognize that the multiple images have been selected together by the multiple users.

Exemplary Modification 6 will be described in detail with reference to FIG. 5. For example, in the case in which a user A is selecting the image 34 (for example, a finger 38 of the user A is contacting the display portion of the image 34), and while the image 34 is being selected by the user A, a user B is selecting the image 36 (for example, in the case in which a finger 40 of the user B is contacting the display portion of the image 36), the function controller 26 recognizes that the images 34 and 36 have been selected together by each of the different users, and controls the notification of information and the execution of functions. In the case in which only one of either the user A or the user B selects the images 34 and 36 together, the function controller 26 does not issue a notification of information, and does not execute functions.

Note that in the case in which a single image is selected by a single user, the function controller 26 controls the notification and execution of the function associated with the image.

According to Exemplary Modification 6, because information is not issued in a notification and functions are not executed in the case in which a single user has selected multiple images together, the security of the information and function may be improved, for example.

In the case in which at least one user among the multiple users has administrator rights, the function controller 26 may control the notification of information and the execution of functions. With this arrangement, the security of information and functions may be improved further.

Exemplary Modification 7

Exemplary Modification 7 will be described. In Exemplary Modification 7, the function controller 26 changes the information to be included in a notification and the function to be executed depending on the user who is selecting multiple images. For example, the function controller 26 may change the function (lone function or link function) depending on the user, and control the notification and execution of the function, or the function controller 26 may change a help screen, manual screen, or the like depending on the user, and control the notification of the information therein. Hereinafter, Exemplary Modification 7 will be described in detail.

Herein, a process in the case of changing a link function depending on the user will be described. FIG. 14 illustrates an example of the link function management table according to Exemplary Modification 7. In the link function management table, a combination of multiple user IDs, a combination of multiple image IDs, information indicating a configuration (equipment 12, software, or target) used in a link function, and information indicating the content of the link function are associated together. The user ID is information for identifying the user who is selecting images. Note that the user who is selecting images (for example, the user who is contacting the display portions of images) is identified by an authentication process or the like, as described in Exemplary Modification 6. For example, an association between a user ID and an image ID may be performed by the user.

For example, the "scan forwarding function" is associated with the combination of a user AAA and the image A (multi-function device A), and the combination of a user BBB and the image B (PC(B)). In other words, in the case in which the user AAA selects the image A, and in this state, the user BBB selects the image B, the function controller 26 causes the display of the UI unit 18 to display information related to the scan forwarding function, or executes the scan forwarding function.

Also, the "print function" is associated with the combination of the user AAA and the image B, and the combination of the user BBB and the image A. In other words, in the case in which the user AAA selects the image B, and in this state, the user BBB selects the image A, the function controller 26 causes the display of the UI unit 18 to display information related to the print function, or executes the print function.

The same process as above is also executed with respect to the images K and M associated with pieces of software, the images E and F associated with files, and the like.

According to Exemplary Modification 7, by changing the user who selects an image, information or functions to be included in a notification may be changed, and the function to be executed may be changed.

Note that in the above example, the notification and execution of link functions are controlled, but a lone function targeted for notification and execution may also be changed, and the information to be included in a notification (such as a help screen or a manual screen, for example) may also be changed depending on the user who selects an image.

Exemplary Modification 8

Exemplary Modification 8 will be described. In Exemplary Modification 8, in the case in which a touch operation is performed on the display portion of an image, the function controller 26 changes the information to be included in a notification and the function to be executed, depending on the mode of contact of the object on the display portion of the image. The mode of contact is the contact area. For example, the function controller 26 may change the function (lone function or link function) depending on the contact area, and control the notification and execution of the function, or the function controller 26 may change a help screen, manual screen, or the like depending on the contact area, and control the notification of the information therein. Note that the function controller 26 may change the information to be included in a notification and the function to be executed depending on the contact area of an object with respect to the display portion of a single image, or change the information to be included in a notification and the function to be executed depending on the contact area of objects with respect to the display portions of multiple images. Hereinafter, Exemplary Modification 8 will be described in detail.

Herein, a process in the case of changing a link function depending on the contact area with respect to multiple images will be described. FIG. 15 illustrates an example of the link function management table according to Exemplary Modification 8. In the link function management table, a combination of multiple image IDs, information indicating a configuration (equipment 12, software, or target) used in a link function, information indicating the contact area, and information indicating the content of the link function are associated together. As described above, the contact area of an object with respect to each display portion is detected by the detector 20.

In the example illustrated in FIG. 15, levels corresponding to sizes of the contact area are defined. Level 1 corresponds to the smallest contact area, and Level 2 corresponds to a contact area that is larger than Level 1. In this way, as the level number increases, a broader contact area is associated. Note that the contact area is the total or average value of the contact areas of objects with respect to each display portion of multiple images being selected together.

For example, the "scan forwarding function", the "print function", and an "other function" are associated with the combination of the images A and B as link functions which are executable using the multi-function device A associated with the image A and the PC(B) associated with the image B. Note that the other function does not have to be associated. Level 1 is associated as the contact area with the scan forwarding function, and Level 2 is associated as the contact area with the print function. The contact area is the total or average value of the contact area with respect to the display portion of the image A and the contact area with respect to the display portion of the image B.

In the case in which objects such as fingers contact the display portion of each of the images A and B, and the total or average value of the contact areas corresponds to the contact area of Level 1, the function controller 26 issues a notification of information related to the scan forwarding function or executes the scan forwarding function corresponding to Level 1. In addition, the function controller 26 may cause the display of the UI unit 18 to display information related to the scan forwarding function corresponding to Level 1 prioritized over (for example, ranked higher than) information related to link functions (for example, the print function) corresponding to levels other than Level 1. For example, as illustrated in FIG. 11, the function controller 26 may cause the display to display information related to the "scan forwarding function" as the link function ranked 1st, and cause the display to display information related to the "print function" as the link function ranked 2nd.

Also, in the case in which objects contact the display portion of each of the images A and B, and the total or average value of the contact areas corresponds to the contact area of Level 2, the function controller 26 issues a notification of information related to the print function or executes the print function corresponding to Level 2. In addition, the function controller 26 may cause the display of the UI unit 18 to display information related to the print function corresponding to Level 2 prioritized over (for example, ranked higher than) information related to link functions (for example, the scan forwarding function) corresponding to levels other than Level 2. For example, as illustrated in FIG. 12, the function controller 26 may cause the display to display information related to the "print function" as the link function ranked 1st, and cause the display to display information related to the "scan forwarding function" as the link function ranked 2nd.

The same process as above is also executed with respect to the images K and M associated with pieces of software, the images E and F associated with files, and the like.

According to Exemplary Modification 8, depending on the contact area with respect to the display portions of images, information or functions to be included in a notification may be changed, and the function to be executed may be changed.

The function controller 26 may also change the link function depending on the contact area with respect to the display portion of each of multiple selected images. For example, in the case in which the contact area with respect to the display portion of the image A corresponds to Level 1, and the contact area with respect to the display portion of the image B corresponds to Level 1, the function controller 26 controls the issuing of a notification of information related to the scan forwarding function or the execution of the scan forwarding function corresponding to Level 1. In the case in which the levels of contact area with respect to the display portion of each image are different from each other, the function controller 26 may control the notification and execution of the link function associated with the lowest level. For example, in the case in which the contact area with respect to the display portion of the image A corresponds to Level 1, and the contact area with respect to the display portion of the image B corresponds to Level 2, the function controller 26 controls the issuing of a notification of information related to the scan forwarding function or the execution of the scan forwarding function corresponding to Level 1.

Note that in the above example, the notification and execution of link functions are controlled, but a lone function targeted for notification and execution may also be changed, and the information to be included in a notification (such as a help screen or a manual screen, for example) may also be changed depending on the contact area.

Exemplary Modification 9

Exemplary Modification 9 will be described. In Exemplary Modification 9, in the case in which a touch operation is performed on the display portion of an image, the function controller 26 changes the information to be included in a notification and the function to be executed, depending on the mode of contact of the object on the display portion of the image. The mode of contact is the contact pressure. For example, the function controller 26 may change the function (lone function or link function) depending on the contact pressure, and control the notification and execution of the function, or the function controller 26 may change a help screen, manual screen, or the like depending on the contact pressure, and control the notification of the information therein. Note that the function controller 26 may change the information to be included in a notification and the function to be executed depending on the contact pressure of an object with respect to the display portion of a single image, or change the information to be included in a notification and the function to be executed depending on the contact pressure of objects with respect to the display portions of multiple images. Hereinafter, Exemplary Modification 9 will be described in detail.

Herein, a process in the case of changing a link function depending on the contact pressure with respect to multiple images will be described. FIG. 16 illustrates an example of the link function management table according to Exemplary Modification 9. In the link function management table, a combination of multiple image IDs, information indicating a configuration (equipment 12, software, or target) used in a link function, information indicating the contact pressure, and information indicating the content of the link function are associated together.

As described above, the contact pressure of an object with respect to each display portion is detected by the detector 20.

In the example illustrated in FIG. 16, levels corresponding to sizes of the contact pressure are defined. Level 1 corresponds to the lowest contact pressure, and Level 2 corresponds to a contact pressure that is higher than Level 1. In this way, as the level number increases, a higher contact pressure is associated. Note that the contact pressure is the total or average value of the contact pressures of objects with respect to each display portion of multiple images being selected together.

For example, the "scan forwarding function", the "print function", and an "other function" are associated with the combination of the images A and B as link functions which are executable using the multi-function device A associated with the image A and the PC(B) associated with the image B. Note that the other function does not have to be associated. Level 1 is associated as the contact pressure with the scan forwarding function, and Level 2 is associated as the contact pressure with the print function. The contact pressure is the total or average value of the contact pressure with respect to the display portion of the image A and the contact pressure with respect to the display portion of the image B.

In the case in which objects such as fingers contact the display portion of each of the images A and B, and the total or average value of the contact pressures corresponds to the contact pressure of Level 1, the function controller 26 issues a notification of information related to the scan forwarding function or executes the scan forwarding function corresponding to Level 1. In addition, the function controller 26 may cause the display of the UI unit 18 to display information related to the scan forwarding function corresponding to Level 1 prioritized over (for example, ranked higher than) information related to link functions (for example, the print function) corresponding to levels other than Level 1. For example, as illustrated in FIG. 11, the function controller 26 may cause the display to display information related to the "scan forwarding function" as the link function ranked 1st, and cause the display to display information related to the "print function" as the link function ranked 2nd.

Also, in the case in which objects contact the display portion of each of the images A and B, and the total or average value of the contact pressures corresponds to the contact pressure of Level 2, the function controller 26 issues a notification of information related to the print function or executes the print function corresponding to Level 2. In addition, the function controller 26 may cause the display of the UI unit 18 to display information related to the print function corresponding to Level 2 prioritized over (for example, ranked higher than) information related to link functions (for example, the scan forwarding function) corresponding to levels other than Level 2. For example, as illustrated in FIG. 12, the function controller 26 may cause the display to display information related to the "print function" as the link function ranked 1st, and cause the display to display information related to the "scan forwarding function" as the link function ranked 2nd.

The same process as above is also executed with respect to the images K and M associated with pieces of software, the images E and F associated with files, and the like.

According to Exemplary Modification 9, depending on the contact pressure with respect to the display portions of images, information or functions to be included in a notification may be changed, and the function to be executed may be changed.

The function controller 26 may also change the link function depending on the contact pressure with respect to the display portion of each of multiple selected images. For example, in the case in which the contact pressure with respect to the display portion of the image A corresponds to Level 1, and the contact pressure with respect to the display portion of the image B corresponds to Level 1, the function controller 26 controls the issuing of a notification of information related to the scan forwarding function or the execution of the scan forwarding function corresponding to Level 1. In the case in which the levels of contact pressure with respect to the display portion of each image are different from each other, the function controller 26 may control the notification and execution of the link function associated with the lowest level. For example, in the case in which the contact pressure with respect to the display portion of the image A corresponds to Level 1, and the contact pressure with respect to the display portion of the image B corresponds to Level 2, the function controller 26 controls the issuing of a notification of information related to the scan forwarding function or the execution of the scan forwarding function corresponding to Level 1.

Note that in the above example, the notification and execution of link functions are controlled, but a lone function targeted for notification and execution may also be changed, and the information to be included in a notification (such as a help screen or a manual screen, for example) may also be changed depending on the contact pressure.

Exemplary Modification 10

Exemplary Modification 10 will be described. In Exemplary Modification 10, in the case in which a touch operation is performed on the display portion of an image, the function controller 26 changes the information to be included in a notification and the function to be executed, depending on the type of object used in the touch operation on the display portion of the image. The object is, for example, a finger of a user, a stylus, a pen, or the like. For example, the function controller 26 may change the function (lone function or link function) depending on the type of object, and control the notification and execution of the function, or the function controller 26 may change a help screen, manual screen, or the like depending on the type of object, and control the notification of the information therein. Note that the function controller 26 may change the information to be included in a notification and the function to be executed depending on the type of object with respect to the display portion of a single image, or change the information to be included in a notification and the function to be executed depending on the types of objects with respect to the display portions of multiple images. Hereinafter, Exemplary Modification 10 will be described in detail.

Herein, a process in the case of changing a link function depending on the type of object will be described. FIG. 17 illustrates an example of the link function management table according to Exemplary Modification 10. In the link function management table, a combination of multiple image IDs, information indicating a configuration (equipment 12, software, or target) used in a link function, information indicating a type of object used in a touch operation on the display portion of an image, and information indicating the content of the link function are associated together.

For example, the controller 24 identifies the object used in the touch operation by an identification process. Specifically, the controller 24 identifies the object by capturing an image of the object with a camera, and analyzing the image generated by the image capture. Additionally, the controller 24 may also cause the display of the UI unit 18 to display a list of object types. From the list of types, the user specifies the type of object used in the touch operation. With this arrangement, the controller 24 recognizes the type of the object.

For example, the "scan forwarding function", the "print function", and an "other function" are associated with the combination of the images A and B as link functions which are executable using the multi-function device A associated with the image A and the PC(B) associated with the image B. Note that the other function does not have to be associated. "Finger" is associated as the object used in the touch operation with the scan forwarding function, and "stylus" is associated as the object with the print function.

In the case in which a finger contacts the display portion of each of the images A and B, and the images A and B are selected together by the finger, the function controller 26 issues a notification of information related to the scan forwarding function or executes the scan forwarding function corresponding to a finger. In addition, the function controller 26 may cause the display of the UI unit 18 to display information related to the scan forwarding function corresponding to a finger prioritized over (for example, ranked higher than) information related to link functions (for example, the print function) corresponding to objects other than a finger. For example, as illustrated in FIG. 11, the function controller 26 may cause the display to display information related to the "scan forwarding function" as the link function ranked 1st, and cause the display to display information related to the "print function" as the link function ranked 2nd.

Also, in the case in which a stylus contacts the display portion of each of the images A and B, and the images A and B are selected together by the stylus, the function controller 26 issues a notification of information related to the print function or executes the print function corresponding to a stylus. In addition, the function controller 26 may cause the display of the UI unit 18 to display information related to the print function corresponding to a stylus prioritized over (for example, ranked higher than) information related to link functions (for example, the scan forwarding function) corresponding to objects other than a stylus. For example, as illustrated in FIG. 12, the function controller 26 may cause the display to display information related to the "print function" as the link function ranked 1st, and cause the display to display information related to the "scan forwarding function" as the link function ranked 2nd.

The same process as above is also executed with respect to the images K and M associated with pieces of software, the images E and F associated with files, and the like.

According to Exemplary Modification 10, depending on the type of object used in a touch operation, information or functions to be included in a notification may be changed, and the function to be executed may be changed.

Note that in the example illustrated in FIG. 17, each image is selected by the same object, but the images may also be selected by different objects. For example, in the case in which the image A is selected by a finger and the image B is selected by a stylus, the notification and execution of the link function associated with the combination of the selection may be controlled.

Note that in the above example, the notification and execution of link functions are controlled, but a lone function targeted for notification and execution may also be changed, and the information to be included in a notification (such as a help screen or a manual screen, for example) may also be changed depending on the type of object using in a touch operation.

Additionally, the function controller 26 may change the information or functions to be included in a notification and change the function to be executed, depending on the type of finger selecting an image. For example, by capturing an image of the finger using a camera, and analyzing the image generated by the image capture, the controller 26 may identify the type of finger selecting an image. Additionally, the controller 26 may also cause the display of the UI unit 18 to display a list of finger types. In the case in which the user selects a type of finger from the list, the controller 26 may recognize the selected type of finger as the type of finger selecting an image. For example, in the case in which the combination of the images A and B, the index finger, and the scan forwarding function are associated with each other, and the images A and B are selected together by the index finger, the function controller 26 controls the notification and execution of the scan forwarding function. Additionally, in the case in which the combination of the images A and B, the middle finger, and the print function are associated with each other, and the images A and B are selected together by the middle finger, the function controller 26 controls the notification and execution of the print function. In this way, depending on the type of finger used in a touch operation, information or functions to be included in a notification may be changed, and the function to be executed may be changed. The images may be selected by the same finger, or selected by respectively different fingers. For example, in the case in which the image A is selected by the index finger, and while in this state, the image B is selected by the middle finger, the notification and execution of the scan forwarding function or the print function may be controlled.

Additionally, the function controller 26 may change the information or functions to be included in a notification and change the function to be executed, depending on the fingerprint of the finger selecting an image. For example, by applying a fingerprint authentication process to the finger selecting an image, the controller 26 detects the fingerprint of the finger. The fingerprint authentication process may also be executed before image selection. For example, in the case in which the combination of the images A and B, fingerprint information indicating a fingerprint, and the scan forwarding function are associated with each other, and the images A and B are selected together by a finger having the fingerprint indicated by the fingerprint information, the function controller 26 controls the notification and execution of the scan forwarding function. The same applies to the print function. In this way, depending on the fingerprint of the finger used in a touch operation, information or functions to be included in a notification may be changed, and the function to be executed may be changed. The images may be selected by the finger having the same fingerprint, or selected by fingers having respectively different fingerprints.

The above terminal device 10 is realized by the cooperative action of hardware and software as an example. Specifically, the terminal device 10 is provided with one or multiple processors such as CPUs (not illustrated). By having the one or multiple processors load and execute a program stored in a storage device (not illustrated), the functions of each unit of the terminal device 10 are realized. The program is stored in the storage device via a recording medium such as a CD or DVD, or alternatively, via a communication link such as a network. As another example, each unit of the terminal device 10 may be realized by hardware resources such as a processor, an electronic circuit, or an application-specific integrated circuit (ASIC), for example. A device such as memory may also be used in such a realization. As yet another example, each unit of the terminal device 10 may also be realized by a digital signal processor (DSP), a field-programmable gate array (FPGA), or the like.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An information processing device comprising: a controller that (i) causes a first image for executing a first function and a second image for executing a second function to be displayed on a screen of a display and (ii) controls a notification of information in a case in which the first image and the second image are contacted by a user simultaneously, wherein the notified information is information related to a third function that is different from the first function and the second function.

2. The information processing device according to claim 1, wherein the third function is a function that is executable using both the first function and the second function.

3. The information processing device according to claim 1, wherein the third function is a different function that does not use the first function or the second function.

4. The information processing device according to claim 1, wherein the first function, the second function, and the third function is a function that is executable using at one from among equipment and software.

5. The information processing device according to claim 1, wherein
the controller changes the information depending on a length of time during which the first image and the second image are contacted by the user.

6. The information processing device according to claim 1, wherein
the controller controls the notification of the information in a case in which the first image and the second image are contacted by respectively different users.

7. The information processing device according to claim 6, wherein
the controller changes the information depending on the users.

8. The information processing device according to claim 1, wherein
the controller changes the information depending on a mode of the contact.

9. The information processing device according to claim 8, wherein
the controller changes the information depending on a surface area of the contact.

10. The information processing device according to claim 8, wherein
the controller changes the information depending on a pressure of the contact.

11. The information processing device according to claim 1, wherein
the controller changes the information depending on an object used in the contact.

12. The information processing device according to claim 11, wherein
the object is a finger of the user, and the controller changes the information depending on a type of the finger.

13. The information processing device according to claim 11, wherein
the object is a finger of the user, and
the controller changes the information depending on a fingerprint of the finger.

14. The information processing device according to claim 1, wherein
the controller additionally controls the execution of the first function in a case in which the first image is contacted but the second image is not contacted, and controls the execution of the second function in a case in which the second image is contacted but the first image is not contacted.

15. The information processing device according to claim 1, wherein the processor controls a notification of information different from the information in a case in which only one of the first image and the second image is contacted by the user.

16. The information processing device according to claim 15, wherein:
the notified information in the case in which the first and second images are contacted by the user simultaneously is information related to a combination of the first and second functions, and
the notified information in the case in which only one of the first and second images is contacted by the user is information related to one of the first and second functions only.

17. A non-transitory computer readable medium storing a program causing a computer to execute a process for processing information, the process comprising: causing a first image for executing a first function and a second image for executing a second function to be displayed on a screen of a display; and controlling a notification of information in a case in which the first image and the second image are contacted by a user simultaneously, wherein the notified information is information related to a third function that is different from the first function and the second function.

18. An information processing device comprising: a controller that (i) causes a first image for executing a first function and a second image for executing a second function to be displayed on a screen of a display and (ii) controls a notification of information in a case in which the first image and the second image are contacted by a user simultaneously, wherein the controller controls the notification of the information such that the notified information differs between (i) when the first image and the second image are simultaneously contacted by different users and (ii) when the first image and the second image are simultaneously contacted by the same user, and the notified information is information related to a third function that is different from the first function and the second function.

19. The information processing device according to claim 18, wherein the controller controls the notification of the information such that the notified information differs between (i) when a first of the different users contacts the first image and a second of the different users contacts the second image and (ii) when the second user contacts the first image and the first user contacts the second image.

* * * * *